(12) United States Patent
Morita et al.

(10) Patent No.: US 6,310,859 B1
(45) Date of Patent: Oct. 30, 2001

(54) PACKET COMMUNICATIONS NETWORK

(75) Inventors: Hideo Morita; Tokuro Doi; Yukichi Saito; Motoshi Tamura; Daisuke Akiyama; Hiroshi Nakamura; Hisakazu Uesaka, all of Kanagawa (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/345,150

(22) Filed: Jun. 30, 1999

Related U.S. Application Data

(63) Continuation of application No. PCT/JP98/04921, filed on Oct. 30, 1998.

(30) Foreign Application Priority Data

| Oct. 30, 1997 | (JP) | 9-2991205 |
| Nov. 6, 1997 | (JP) | 9-304764 |
| Nov. 6, 1997 | (JP) | 9-304765 |

(51) Int. Cl.[7] .......................................... H04J 3/17
(52) U.S. Cl. ..................... 370/235; 370/433; 370/435
(58) Field of Search ..................... 370/248, 250, 370/252, 338, 433, 468, 235, 435, 528; 379/266, 201

(56) References Cited

U.S. PATENT DOCUMENTS

| 5,452,295 | 9/1995 | Nakagaki et al. . |
| 5,850,395 | * 12/1998 | Hauser et al. ................. 370/398 |
| 6,011,845 | * 1/2000 | Nabkel et al. ................. 379/266 |
| 6,144,635 | * 11/2000 | Nakagawa ..................... 370/229 |

FOREIGN PATENT DOCUMENTS

| 2-101843 | 4/1990 | (JP) . |
| 5-191457 | 7/1993 | (JP) . |
| 6-14050 | 1/1994 | (JP) . |
| 8-46643 | 2/1996 | (JP) . |
| 9-172683 | 6/1997 | (JP) . |
| 10-164069 | 6/1998 | (JP) . |

OTHER PUBLICATIONS

International Search Report (in Japanese) for International Application No. PCT/JP98/04921, with search report mailed Feb. 2, 1999.

* cited by examiner

Primary Examiner—Wellington Chin
Assistant Examiner—Brenda Pham
(74) Attorney, Agent, or Firm—Brown Raysman Millstein Felder & Steiner LLP

(57) ABSTRACT

Control of a packet communications network in a fixed network used by a mobile communications network is performed. (1) A communication hold mode is set for a user when the traffic volume of the user's transmission or reception of a packet per fixed time period is less than a predetermined value. The communication hold mode is defined as "although the network resources are released once, a mobile station and a gateway center at an interface with an external network behave to the user side and the external side as though the communication hold mode were maintained". (2) When the user in the communication hold mode restarts the transmission of a packet, the mobile station automatically carries out a recall processing without the intervention of the user, and re-establishes the communication up to the gateway carrier. (3) When the gateway center restarts receiving a packet to the user in the communication hold mode, the gateway center carries out the incoming recall processing without the intervention of the external network, and re-establishes the communication all the way to the mobile station. (4) To accomplish the incoming recall processing, the mobile station makes a location registration when it roams across location registration areas after a transition into the communication hold mode.

40 Claims, 21 Drawing Sheets

| INPUT LINES/ CHANNELS 301 | INPUT PACKETS ADDRESSES 302 | DESTINATION LINES/ CHANNELS 303 | OUTPUT PACKET ADDRESSES (NOTES) 304 |
|---|---|---|---|
| A | 00000001 | X | 00000008 |
| F | 00000002 | Z | 00000004 |
| C | 00000003 | Y | 00000006 |
| B | 00000004 | W | 00000003 |
| | ... | | ... |

NOTES: WHEN CHANGING PACKET ADDRESSES IN DESTINATION LINES/CHANNELS

*FIG.3*

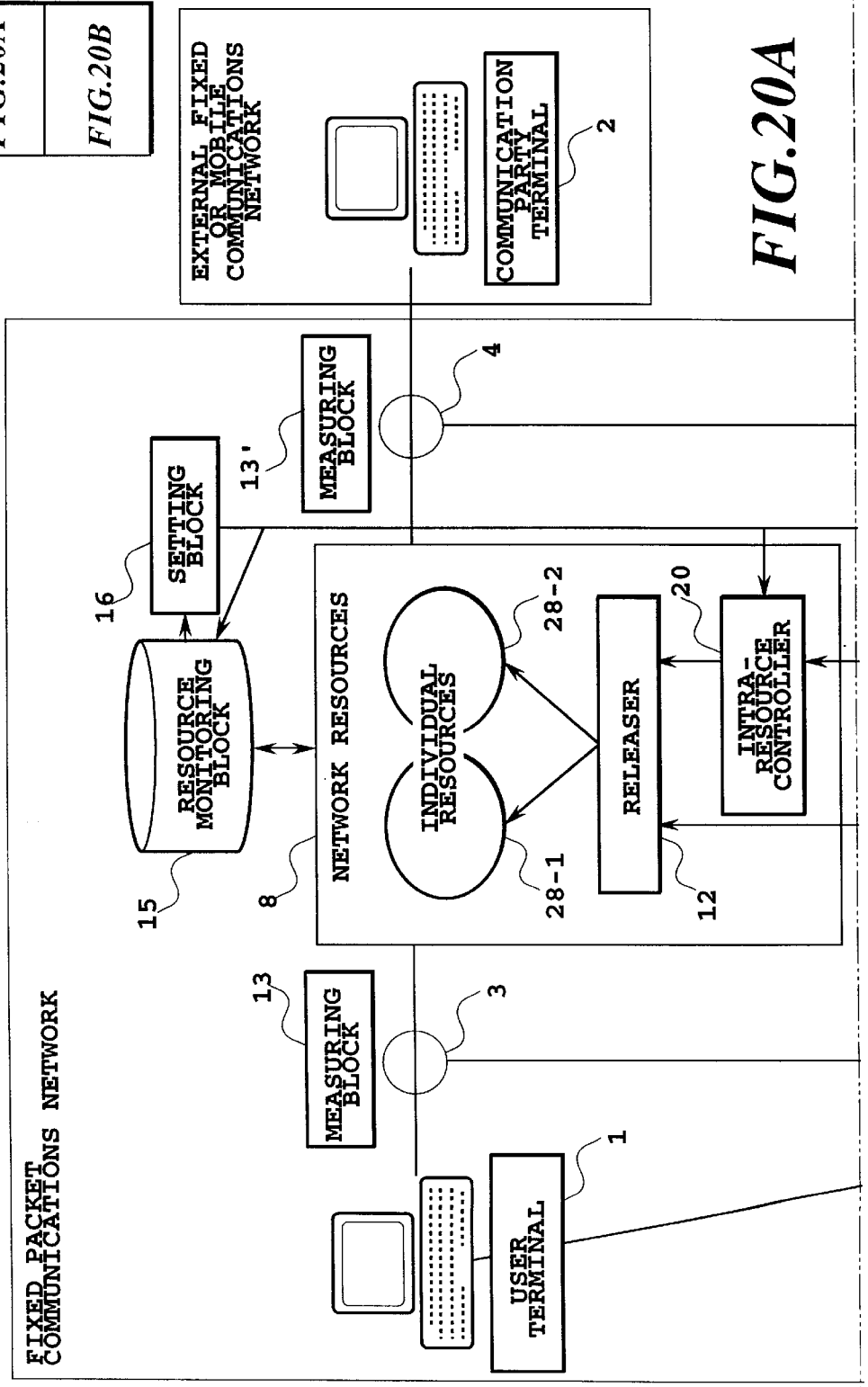

PACKET COMMUNICATIONS NETWORK

This application is a continuation of PCT/JP98/04921 filed Oct. 30, 1998.

TECHNICAL FIELD

The present invention relates to a packet communications network for transmitting and receiving packet data, and more particularly to a packet communications network in a mobile communications system.

BACKGROUND ART

Generally, service providers of packet communications charge for packet services by measured rates corresponding to packet information amounts rather than by communication time periods corresponding to connection duration.

This is because to achieve the measured rate system, it is enough for each packet switching node of the network only to write, when starting each packet service, a table for determining a route toward a destination in accordance with a packet destination address, and no other processings are required until the next packet with that destination address arrives. Thus, the measured rate system is economically viable for the service providers.

On the other hand, having established a transmission route once at the beginning of a packet communication, its user is not charged unless he or she actually transmits a packet. Thus, the user usually holds the packet line for making intermittent low information rate communications, which provides an advantage of being able to transmit and receive a packet immediately when information takes place, without setting up communications each time for exchanging information.

Holding the packet line, however, occupies a part of the resources of the packet network, such as resources for maintaining transmission quality. The resources in the network occupied for setting up packet lines are not charged.

If the resources in the network is unavailable (this is referred to as "busy"), another user who tries to establish a communication afterward cannot achieve this. To provide the packet communications services simultaneously for a great number of (unspecified) users making use of the resources of a particular section in common, the resources in that section must be prepared for individual users, requiring an enormous amount of resources. This not only imposes heavy economic burden on the carrier, but also involves a waste of the resources during such hours as midnight when they are not used enough.

Furthermore, besides the packet transmission processings described above, the packet communication services in the mobile communications require mobility control because of roaming of users. In other words, handover is required which switches, following the roaming of a mobile station, base stations that communicate with the mobile station. Accordingly, when providing the packet communications services in the mobile communications, it is desirable to earn its cost that rates by amounts of roaming be added to the measured rates. Most users, however, are unacceptable such a rate system that differs from that of the services widely provided in fixed networks.

SUMMARY OF THE INVENTION

Thus, the packet communications services present a problem of holding free-of-charge circuit conditions at low cost, that is, holding the circuit conditions in which no or little packet exchange is carried out in practice, although communications are being established by packet communications users.

In particular, it is an important problem in the mobile communications to hold the circuits with implementing handover.

In this case, it is also a matter of the present invention of providing economical communications services that can share the resources in the network to as many users as possible with ensuring them to make maximum use of communication rates required for achieving data communications.

To accomplish the foregoing problems, the present invention provides a resource managing method in a packet communications network comprising the steps of: monitoring traffic of a user after establishing a communication; releasing at least part of resources assigned to the user by placing a communication mode of the user into a communication hold mode when a prescribed monitor condition is satisfied; and releasing the communication hold mode and recovering the communication mode when a packet communication is started in the communication hold mode.

The communication hold mode can be a mode that releases transmission path resources and transit node resources in a section of a user connection to allow another user to use the resources in the section.

The prescribed monitor condition for proceeding from the communication mode to the communication hold mode can be that no transmission nor reception of a user takes place during a reference time period.

The step of monitoring can comprise the step of: measuring a time period during which each user suspends packet transmission and reception, and sending the measured time period, and the step of setting the hold mode can comprise the steps of: receiving the measured time period sent; comparing the measured time period with a predetermined reference time period, and notifying that the measured time period exceeds the reference time period; issuing a release command of the resources assigned to the user when notified that the reference time period is exceeded; and releasing the resources assigned to the user in response to the release command issued. The step of releasing the resources can change a state of the resources according to time.

The method can comprise a mode which precedently assigns resources to the user in the hold mode when hanging the state of the resources according to time.

The step of setting the hold mode can further change the reference time period. The change of the reference time period can be carried out by registering and recording a reference time period for each user, and by referring the reference time period stored in the storage means for each user.

The reference time period can be designated by each user, or can be set by measuring for each user a frequency of use of communications, and by computing the reference time period based on the frequency.

Besides, the reference time period can be set in accordance with a working rate obtained by continuous monitoring.

The step of releasing resources may further comprise a release control step of controlling a sequence and timing of a release of the resources secured by each user.

The release control step may control the release based on a predetermined sequence and timing.

A node at an end of a section in the communication hold mode can return a false signal acknowledging a connection in response to a connection acknowledge signal which is sent in the communication hold mode from a side placed in the communication mode.

A node at an end of a section in the communication hold mode can send in the communication hold mode a connection acknowledge signal acknowledging a connection to a side placed in the communication mode. The node at the end can complete the communication when the node at the end cannot acknowledge the connection by sending the connection acknowledge signal.

The step of recovering the communication mode from the communication hold mode can use a procedure of a normal outgoing and incoming call.

The method can store, when making a transition to the hold mode, in the end node of the section in the communication hold mode, a routing table used for the recovering.

The packet communications network can be a mobile network. In this case, a mobile station can carry out its location registration in the communication hold mode as in a normal waiting mode.

The resources in an origination of the roaming can be released by notifying of roaming of a user, by managing information about the user by using information installed in a destination of the roaming, by securing network resources in accordance with the information about the user, and by deleting the information about the user which becomes unnecessary to be managed.

BRIEF DESCRIPTION OF THE DRAWINGS

FIG. 3 is a diagram showing an example of a packet routing table;

FIGS. 20A and 20B are diagrams illustrating a release of resources of a packet communications network, with FIG. 20 showing the relationship between them.

BEST MODE FOR CARRYING OUT THE INVENTION

The invention will now be described with reference to the accompanying drawings.

EMBODIMENT 1

First, a packet communication of a mobile user with a user in an external network will be described as an embodiment 1.

Figure 1:
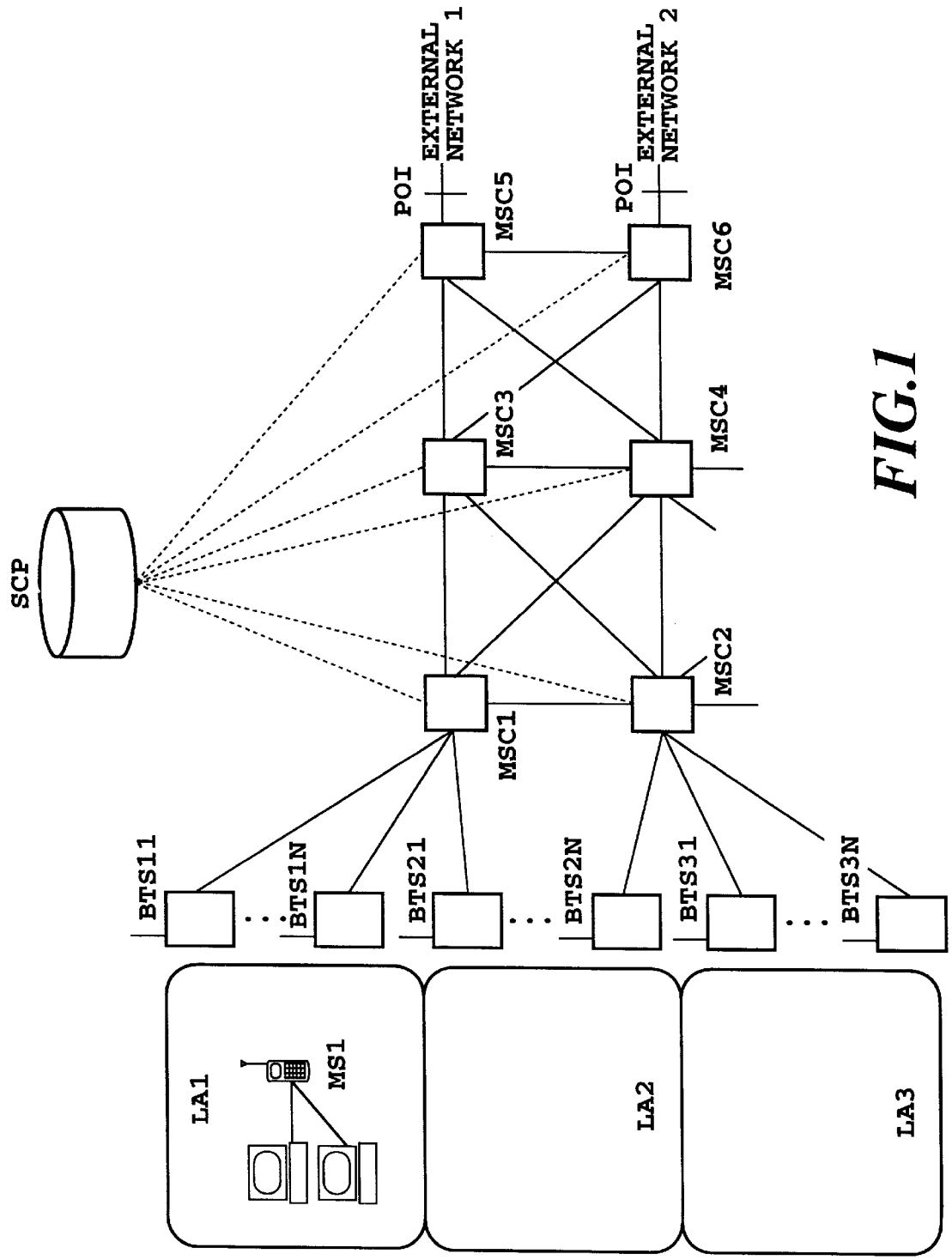
FIG. 1 is a block diagram showing a network configuration.

FIG. 1 is a block diagram showing a network configuration, in which the symbol MS designates a mobile station, BTS designates a base transceiver station, MSC designates a mobile switching center (transit switching center), and SCP designates a service control point.

A plurality of packet communication terminals are connected to the mobile station, so that the single mobile station can achieve multiple communications at the same time. Although an adapter is required in some cases between the user terminals and the mobile station, it is assumed here that the mobile station includes the function of the adapter. Base stations BTS11–BTS1N provides radio access in a location area LA1, base stations BTS21–BTS2N provides radio access in a location area LA2, and base stations BTS31–BTS3N provides radio access in a location area LA3. Switching centers MSC1 and MSC2 are connected to these base stations rather freely. Switching centers MSC3 and MSC4 transit information collected by the switching centers MSC1 and MSC2. Switching centers MSC5 and MSC6 achieve functions as a gateway to and from external networks 1 and 2. Although these switching centers are basically the same equipment in that they switch information, they achieve functions of a subscriber MSC, transit MSC, and so on depending on the network configuration. These functions of the switching centers can be integrated into a single switching center in accordance with the network configuration. The service control point SCP stores subscriber information and location information on the mobile stations for carrying out service control.

Figure 2:
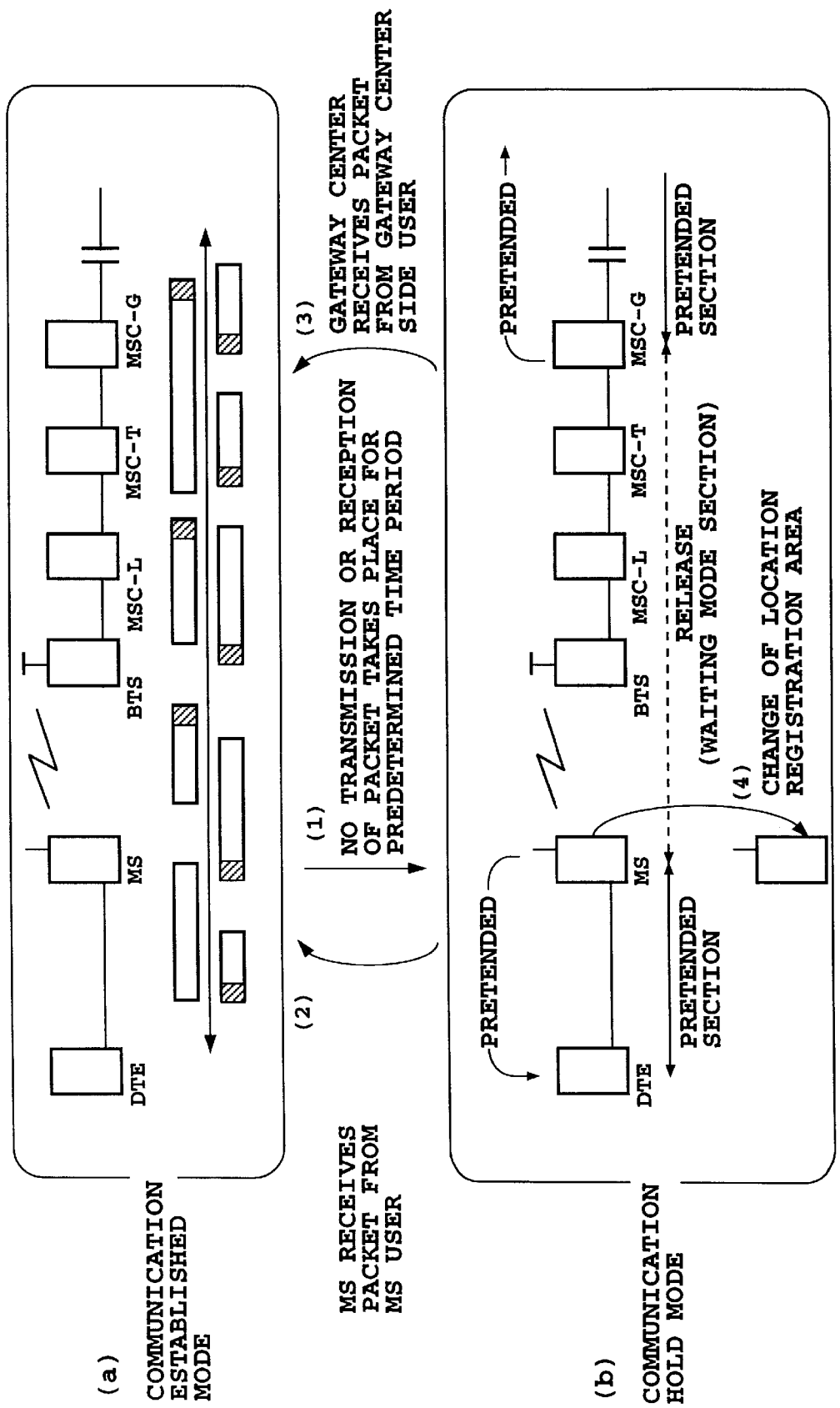
FIG. 2 is a block diagram illustrating an outline of the operation of the present invention.

Next, the outline of the present invention will be described with reference to FIG. 2. In FIG. 2, the symbol DTE designates a device connected to the mobile station for carrying out data communications (like a personal computer). BTS designates a base transceiver station; MSC-L designates a local switching center; MSC-T designates a transit switching center; and MSC-G designates a gateway switching center connected with external networks. The configuration as shown in FIG. 2 is arranged by extracting, from the configuration as shown in FIG. 1, nodes or the like constituting a communication route.

A communication route is established in this configuration for the mobile station to exchange packets with an external network through the base station BTS. The communication route has two modes: communication established mode of FIG. 2(a); and communication hold mode of FIG. 2(b), which will be described now.

(1) The communication hold mode starts unless packet exchange of more than a fixed amount of traffic takes place for a fixed time period with a user. It is defined as "a mode in which although the resources in the network are released once, the mobile station and the gateway switching center interfacing the external networks behave as though they were maintaining the communication established mode for the user side and the external network side".

(2) When the user in the communication hold mode restarts transmitting a packet, the mobile station carries out a reconnection processing (like a recalling processing) without the intervention of the user, thereby setting up the communication established mode again all the way to the gateway switching center.

(3) When the gateway switching center restarts receiving a packet for the user in the communication hold mode, the gateway switching center carries out a reconnection processing (like a recalled processing) without the intervention of the external network, thereby setting up the communication established mode again all the way to the mobile station.

(4) To achieve the reconnection processing (like the recalled processing) of (3), the mobile station carries out a location registration when it changes its location after the transition to the communication hold mode.

Returning to FIG. 1, the operation outlined above will be described in more detail.

[Originating call from the mobile station]

First, the operation from a call origination by the mobile station to the communication establishment up to the gateway switching center will be described.

The mobile station MS1 sends an originating signal for starting a packet communication to the subscriber switching center (MSC1, for example) through a visitor location base station (BTS11, for example). The subscriber switching center MSC1 analyzes the originating signal, and decides a called terminal. When the called terminal belongs to the external network 1, for example, the subscriber transit center MSC1 establishes a connection to the gateway transit center MSC5 by capturing communication paths (such as a radio channel, a subscriber line and a transit path) and communication processing resources (such as a handover trunk, a service processing trunk, and a transaction).

The analysis and decision of the called terminal can be carried out either by using data for the analysis stored in the subscriber transit center, or by inquiring from the subscriber transit center to the service control center that possesses the data for the analysis.

The gateway transit center MSC5 communicates with an opposite gateway node in the external network, and establishes the communication to it, and thus to the called party in the network 1 (the external network can extend the call even to a third network).

Alternatively, the user can establish the communication only within the network by continuously maintaining the communication establishment between the networks by determining in advance, between the gateway transit center MSC5 and the opposite gateway node, either packet addresses associated with particular users or part of packet addresses shared by a group of users (as example of the packet addresses, there are IP packet addresses, e-mail addresses and domain names).

The foregoing operation can establish the communication path from the user of the mobile station to the party user in the external network, and the resources for the processing, which makes it possible to exchange packets with a specified address thereafter.

Although the present embodiment does not describe the details of a method of assigning an address or of establishing a rout using the address, these methods are roughly divided into a method of using a single address from the mobile station to the gateway switching center, and a method of relaying a plurality of addresses between them.

In either case, the transit centers or base stations manage relationships between address or addresses used by a user and paths and channels toward the destination by using a table. Furthermore, although the transmitting side and the receiving side can use either the same address or different addresses depending on a transmission method, this is reduced to a matter of whether the transmitting side and the receiving side manage the table commonly or independently, either of which the present embodiment can cope with.

FIG. 3 shows an example of a packet routing table generated in each packet transmission/switching nodes (mobile station, base station and switching centers) involved in the establishment of the communication path. The mobile station, for example, receives from a plurality of users packets with different addresses, and decides outgoing radio channels from input ports/channels or input packet addresses. When changing packet addresses from the input addresses in the radio section, the mobile station refers to the table and rewrites the input packet address to an output packet address (when the outgoing radio channel transmits only packets from a particular user, the packet address can be omitted to avoid redundancy).

The base station decides an outgoing channel from the input radio channel and input packet address, and sends the packet to the outgoing channel after rewriting, if needed, its address to an output address. Subsequently, the subscriber transit center and the transit switching center carries out routing in the same manner, so that the gateway transit center finally transfers the packet to the external network.

[Terminating call TO the mobile station]

To received an incoming call for starting a packet communication, the mobile station to which the users are connected must continuously perform the location registration to notify the network of the location area the mobile station visits. Thus, detecting that it moves into a new location area from the information broadcast by the base station, the mobile station registers the new location area to the service control point through the visitor location base station and the transit centers.

The user also conducts an in-call registration in advance by notifying the service control point of the mobile station to which he or she is connected now.

Assuming that the location registration of the mobile station to which the user is connected and the in-call registration of the user have been completed, an incoming call from an external network 1 to the user through the gateway transit center MSC5 will be described.

The gateway transit center MSC5 establishes a communication with the opposite gateway node of the external network 1 by communicating with it. When steady addresses are predetermined between the gateway transit center MSC5 and the opposite gateway node of the external network 1 as described above, the communication establishment between the networks can be omitted. In this case, in place of the incoming call signal, a reception of a packet from the external network can trigger the incoming call processing in the network.

Subsequently, to establish the communication to the user, the gateway transit center MSC carries out paging and decides the base station at the location the user is visiting.

To achieve the paging, the gateway transit center MSC5 notifies the service control point SCP of either the user identifier of the incoming call, which is included in the incoming call signal received from the external network 1, or the packet address assigned in advance. The service control point SCP refers to the in-call state of the called user by using the user identifier of the incoming call or the assigned packet address, decides the mobile station the called user is connected, and identifies the location area from the location registration of the mobile station. After that, the gateway transit center MSC5 carries out paging of the called mobile station through the base station group accommodating the location area, decides the base station that receives a response from the mobile station as the visitor location base station, and establishes the communication between the mobile station and the gateway transit center as in the originating call, thereby enabling the subsequent packet transmission and reception.

[HANDOVER AFTER COMMUNICATION ESTABLISHMENT]

Once the communication has been established in response to the incoming or outgoing call, the packet exchange becomes possible between the mobile user and the party user at any desired timing. If the mobile user moves, for example, from the current base station BTS11 toward the base station BTS12 in this state, and changes the visitor location from the former to the latter, the handover is carried out. There are variety of methods in the handover according to a radio scheme or a moving scheme of the handover.

Although the handover method is not specified in the present invention, a prescribed handover is carried out to update the visitor location base station and the routing route as long as the packet exchange is present of more than a fixed amount of traffic per fixed time period between the mobile user and the party user.

[TRANSITION TO COMMUNICATION HOLD MODE]

It is preferable that the mobile station or the gateway transit center (or the mobile station and the gateway transit center) monitor the traffic of the user packets, and decide the transition to the communication hold mode unless the packet exchange is present of more than a fixed amount of traffic per fixed time period (one or more packets per ten minutes, for example), (through any node other than the mobile station and the gateway transit center can perform the monitoring and decision as long as it belongs to the routing route of the packet).

Deciding the transition to the communication old mode, the node sends a trigger signal for transferring to the communication hold mode to release the entire associated resources in the network except for minimum resources needed for reestablishing the communication.

In the present embodiment, the minimum resources are reserved so that the communication hold mode can be recovered without any reestablishing processing on the side of the user or external network, which enables the user and external network to behave as through the current communication were kept continuing. The following are the minimum resources necessary for reestablishing the communication.

Establishment conditions of the packet routing table in the mobile station with the user side.

Establishment conditions of the packet routing table in the gateway transit center with the external network.

The other resources can be released.

To use the resources, the mobile station side and the gateway center side must possess an outgoing/incoming recall parameter hold function. Alternatively, the service control point SCP can hold that function. When the mobile station side/gateway center side hold the table for storing the parameters, both the mobile station side and the gateway center side must possess the table for the outgoing/incoming recall. For this reason, to achieve transition to the hold mode, the side which makes the decision of the transition must convert the table in accordance with the format of the party (the other side), and transmits it to the other side as needed.

Subsequently, the mobile station and the gateway transit center monitor the user who holds the communication to restart of the packet communication (although when the hold section is established over a section other than between the mobile station and the gateway transit center, the nodes at both ends of that section monitor the user).

[LOCATION REGISTRATION DURING COMMUNICATION HOLD MODE]

After the transition to the communication hold mode, the mobile station registers, when it move into a new location area, the latest location area to the service control point in the same manner as when the communication is not established. As the location registration method in this case, a time-based location registration or a distance-based location registration can also be used besides the location-based location registration.

[PROCESSING OF CONNECTION ACKNOWLEDGEMENT SIGNAL DURING COMMUNICATION HOLD MODE]

There is a signal for acknowledging a user connection during the communication.

During the communication hold mode, this signal sent from the mobile terminals connected to the mobile station, or the signal sent from the external networks to the gateway center is handled by the mobile station or the gateway center, respectively, which generates a false signal as though it were an acknowledgment signal sent from the party terminal, and returns the false signal.

Reversely, the mobile station and the gateway center on the mobile network side have a function of transmitting to the terminals connected to the mobile station and to the terminals on the external network side, respectively, a connection acknowledgment signal for checking whether the terminals are being connected.

Thus, using the acknowledgment signal, the connection can be checked of the terminals. If the connection cannot be confirmed by the connection acknowledgment signal, the communication is halted. In this case, the halt is informed from the mobile station to the gateway center or vice versa. Thus, the mobile station or the gateway center terminates the communication with the side which continues the hold mode.

[RECONNECTION IN COMMUNICATION HOLD MODE-FIRST]

When the mobile station detects that the user in the communication hold mode restarts the packet transmission, it carries out the reconnection of the hold section using the packet retransmission as a trigger signal. As a method for implementing the reconnection, the mobile station uses the established conditions (not yet released) with the user stored in the packet routing table in the mobile station in order to establish the communication up to the gateway transit center MSC5 in the same procedure as in the outgoing call from the mobile station. This enables the packet exchange without any specific operation on the user side.

[RECONNECTION IN COMMUNICATION HOLD MODE-SECOND]

When the gateway transit center detects a restart of receiving a packet addressed to the user in the communication hold mode, it carries out the reconnection of the hold section using the packet reception restart as a trigger signal. As a method for implementing the reconnection, the gateway transit center uses the established conditions (not yet released) with the external network stored in the packet routing table in the gateway transit center in order to establish the communication down to the mobile station in the same procedure as in the incoming call to the mobile station. This enables the packet exchange without any specific operation on the external network side.

To achieve the reconnection, the update of the location registration by the mobile station in the communication hold mode is assumed.

[TERMINATE COMMUNICATION IN COMMUNICATION HOLD MODE]

The communication is terminated if no response is returned from the terminal to the connection acknowledgment signal sent from the mobile station side/gateway center side. In this case, the communication termination is informed from the mobile station side to the gateway center side, or vice versa. In this case, the side in the holding state (the gateway center side when the mobile station does not respond, or the mobile station side when the gateway center side does not respond) carries out the communication termination processing.

Thus, the packet communications between the terminals connected to the mobile station and the those connected to the external network can be achieved with making efficient use of the channel resources.

EMBODIMENT 2

[COMMUNICATION FROM MOBILE USER TO MOBILE USER]

Although the embodiment 1 describes an example of the communication between the mobile user and the external network, the present embodiment describes the communication between mobile users.

Figure 4:
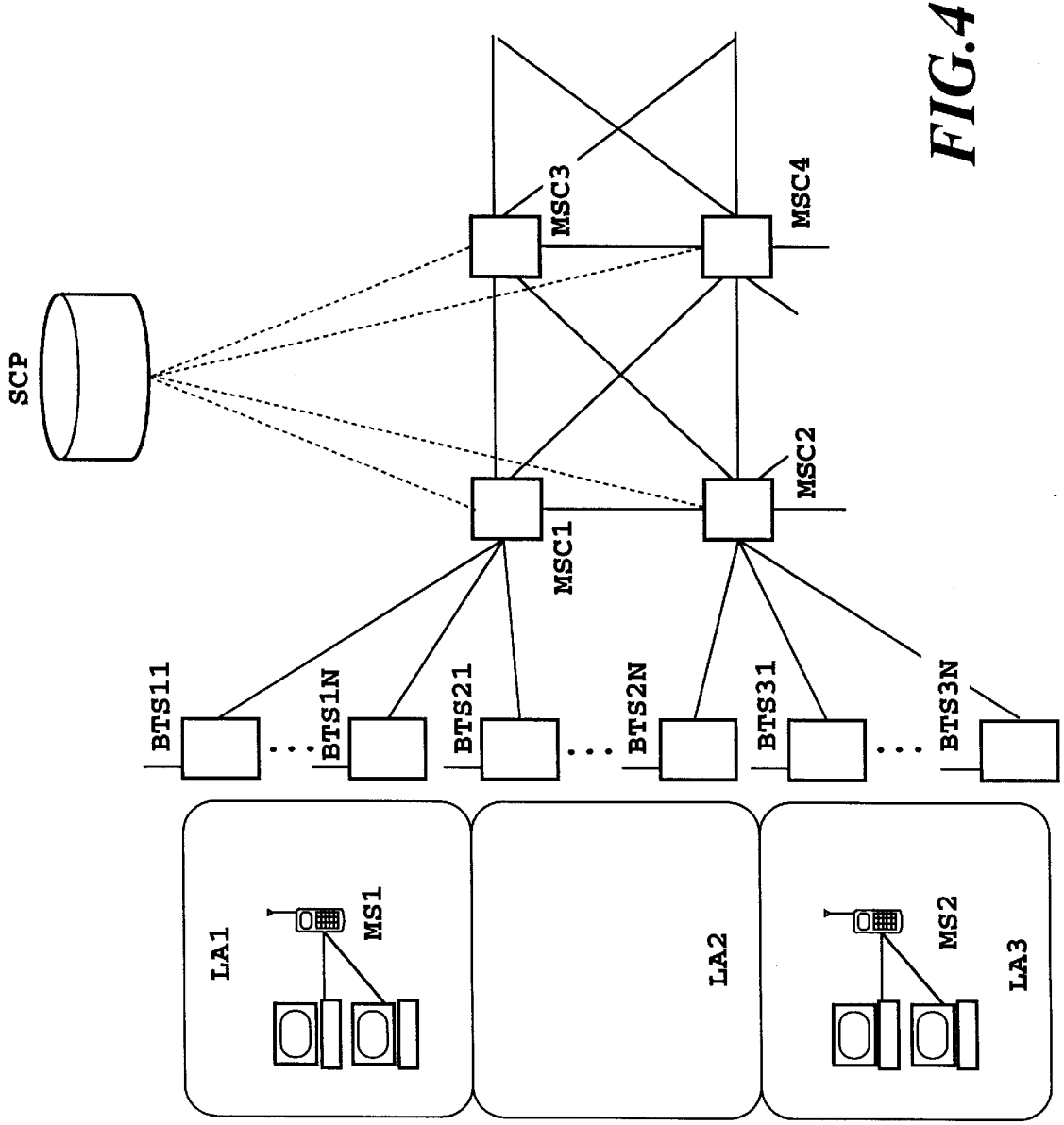
FIG. 4 is a block diagram showing an external network configuration.

FIG. 4 is a block diagram showing a configuration of a network for the communications between mobile users, in which although the gateway transit centers are omitted, the remaining components are the same as those of FIG. 1.

[OUTGOING OR INCOMING CALL OF MOBILE STATION]

Referring to FIG. 4, the communication establishing operation will be described when the mobile station MS1 originates a call, and the mobile station MS2 terminates the call.

The mobile station MS1 sends to the subscriber transit center MSC1 through a visitor location base station (BTS11, for example) an originating signal for starting a packet communication. The subscriber transit center MSC1 analyzes the originating signal, and decides a called party. When the called party is a mobile user, the subscriber transit center MSC1 inquires the service control point SCP of the location area LA of the called party, and carries out paging for deciding the base station the called mobile user is located in the location area LA.

To achieve the paging, the subscriber transit center MSC1 notifies the service control point SCP of the identifier of the called user which is included in the originating signal sent from the calling user. The service control point SCP refers, using the identifier of the called user, the incoming call registration state of the called user, decides the mobile station to which the called user is connected, and identifies the location area of the mobile station from its location registration state. Afterward, the base station group of the location area carries out the paging for the mobile station, decides the base station (BTS31, for example) connected to the mobile station which responds to the paging as the visitor location base station, and establishes a communication between the calling mobile station MS1 and the called mobile station MS2. In the network configuration as shown in FIG. 4, since a trunk is provided between the subscriber transit centers that combine the visitor location base stations, a communication route can be established such as the mobile station MS1-base station BTS11-transit center MSC1-transit center MSC2-base station BTS31-mobile station MS2. After establishing the communication route in this way, the exchange of the packets becomes possible.

The same packet routing tables as described in the embodiment 1 in connection with FIG. 3 are created by the packet transmission/switching nodes (mobile stations, base stations and transit centers) in conjunction with the establishment of the communication path.

[HANDOVER AFTER COMMUNICATION ESTABLISHMENT]

The handover after the communication establishment is carried out as in the embodiment 1. In the present embodiment 2, since the mobile stations MS1 and MS2 roam independently, the handover is also carried out independently by the mobile stations MS1 and MS2.

Next, control of the hold mode will be described which characterizes the present invention.

[TRANSITION TO COMMUNICATION HOLD MODE]

The mobile station MS1 or MS2 (or the mobile stations MS1 and MS2) monitors the traffic volume of packets of a particular user, and decides the transition to the communication hold mode unless a packet exchange of more than a fixed traffic volume per fixed time period occurs (the decision can be made by any nodes (like transit centers) other than the mobile station as long as the nodes belong to the routing route of the packets).

Deciding the transition to the communication hold mode, the node outputs a trigger signal for the communication hold mode, and releases using the trigger signal the entire associated resources in the network except for a minimum resources required for reestablishing the communication.

As the minimum resources needed for reestablishing the communication, the following resources can be named.

The establishment conditions with the user side in the packet routing table in the mobile stations MS1 and MS2. The other resources can be released.

To use the resources, the mobile station side and the gateway center side must possess an outgoing/incoming recall parameter hold function. Alternatively, the service control point SCP can hold that function. When the mobile station side/gateway center side hold the table for storing the parameters, both the mobile station side and the gateway center side must possess the table for the outgoing/incoming recall. For this reason, to achieve transition to the hold mode, the side which makes the decision of the transition must convert the table in accordance with the format of the party (the other side), and transmits it to the other side as needed.

Subsequently, the mobile stations MS1 and MS2 monitor the restart of the packet communication from each of the users who hold the communication.

[LOCATION REGISTRATION DURING COMMUNICATION HOLD MODE]

After the transition to the communication hold mode, the mobile stations MS1 and MS2 each register, when they moves into a new location area, the latest location area to the service control point in the same manner as when the communication is not established.

[RECONNECTION IN COMMUNICATION HOLD MODE]

When the mobile station MS1 or MS2 detects that the user in the communication hold mode restarts the packet transmission, it carries out the reconnection of the hold section using the packet transmission restart as a trigger signal. As a method for implementing the reconnection, the mobile station, using the established conditions (not yet released) with the user stored in the packet routing table of the mobile station MS1 or MS2, establishes a communication all the way to the party mobile station in the same procedure as in the outgoing call from or incoming call to the mobile station. This enables the packet exchange without any specific operation on the user side.

To achieve the reconnection, the update of the location registration by the mobile stations MS1 and MS2 in the communication hold mode is assumed.

[TERMINATE COMMUNICATION IN COMMUNICATION HOLD MODE]

The communication is terminated unless a response to the connection acknowledgment signal sent from the mobile station side/gateway center side is returned from the terminals. In this case, the communication termination is informed from the mobile station side to the gateway center side, or vice versa, and the holding state side (the gateway center side when the mobile station does not respond, or the mobile station side when the gateway center side does not respond) carries out the communication termination processing.

[APPLICATION TO FIXED PACKET NETWORK]

Although the foregoing embodiments are explained taking the packet communications in the mobile communications network as an example, the control can be achieved by installing the communication hold mode in a fixed packet communications network. In this case, the control portion for the location registration can be obviated.

As described above, providing the communication hold mode enables the efficient use of the resources of communications circuits in the packet communications network. The control of the communication hold mode will now be described in detail.

First, release of the resources will be described with reference to FIG. 5, which takes place when the user holds the resources but does not transmit or receive any packet.

Figure 5:
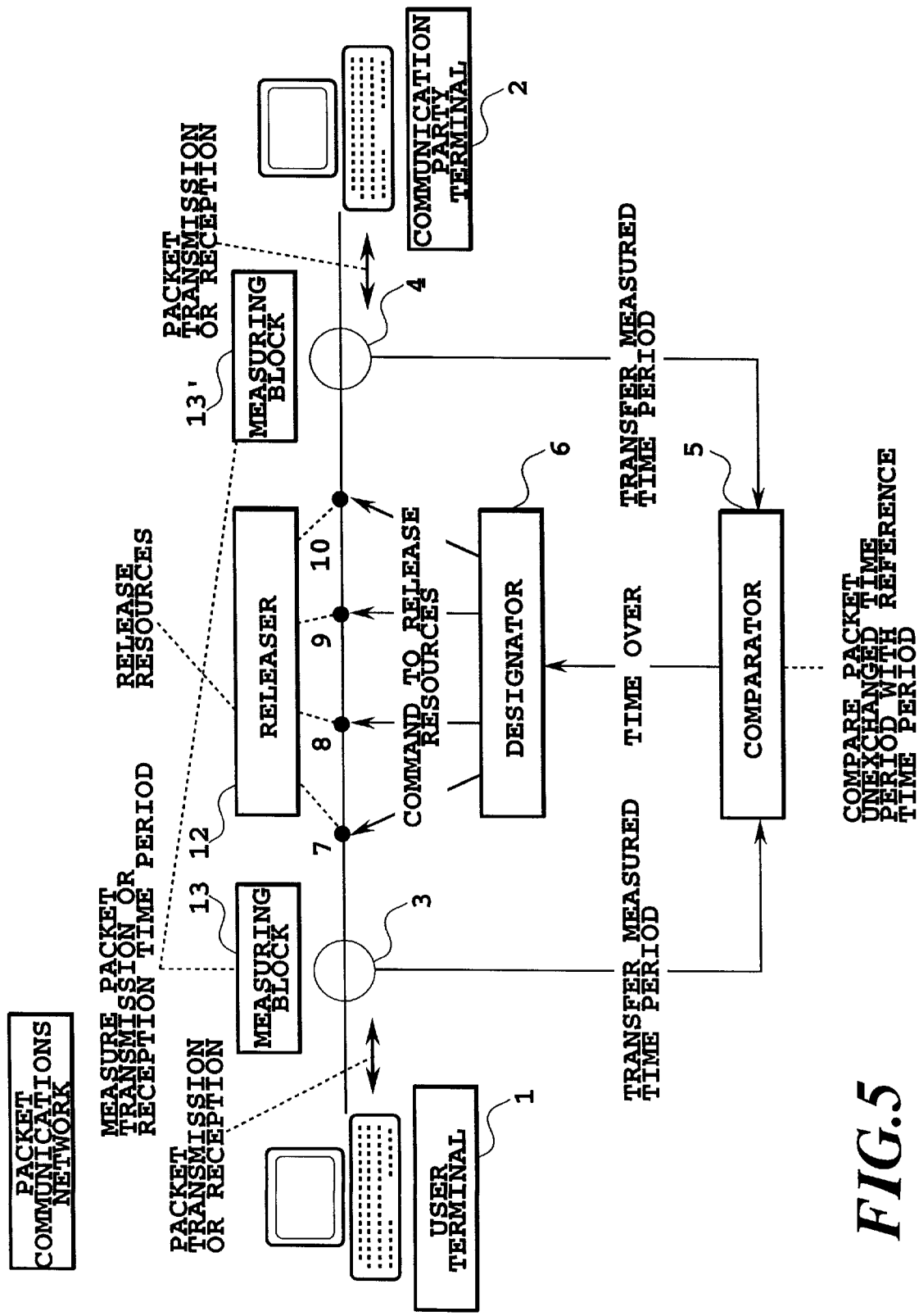
FIG. 5 is a block diagram showing a configuration of a fixed packet communications network in accordance with the present invention.

FIG. 5 is a block diagram showing an embodiment of the packet communications network in accordance with the present invention. First, a configuration in the network will be described for transferring packets between a user terminal 1 and a party terminal 2 using this packet communications network.

Measuring blocks 13 and 13' each measure a time period during which the user terminal 1 transmits or receives a packet, and a time period during which it does not, and transfer the measured time periods to a comparator 5. Although the measuring blocks 13 and 13' can be placed in any node constituting a given section of the packet network, they must be installed considering that they are for checking the packets exchanged between the user terminal 1 and the party terminal 2 in the resource release mode.

The comparator 5 has a function to store a reference time period. Besides, it compares, on the basis of the data transferred from the measuring block 13 or 13', the prestored reference time period with a time period during which the packet are not exchanged. Furthermore, the comparator 5 notifies a designator 6 that the time period during which the packet are not exchanged exceeds the reference time period.

On the basis of the information transferred from the comparator 5, the designator 6 designates a releaser 12 in each of nodes 7–10 to release its resources.

The designator 6 and the comparator 5 can be installed in any node constituting a path of the packets, or other nodes in the network.

Next, the operation will be described for effectively reestablishing the communication in the packet network as shown in FIG. 5.

The measuring blocks 13 and 13' each measure a packet exchange state of each user, and transfer the measured results to the comparator 5. The comparator 5 compares the time periods during which the packet is not exchanged with the reference time period, and if at least one of the time periods fed from the measuring blocks 13 and 13' exceeds the reference time period, the comparator 5 makes a decision that a time-over takes place. Thus, the designator 6 sends to the resource releasers 12 of the nodes 7–10 a command to release the resources. Receiving the command, the resource releasers 12 relinquish the resources.

Figure 6:
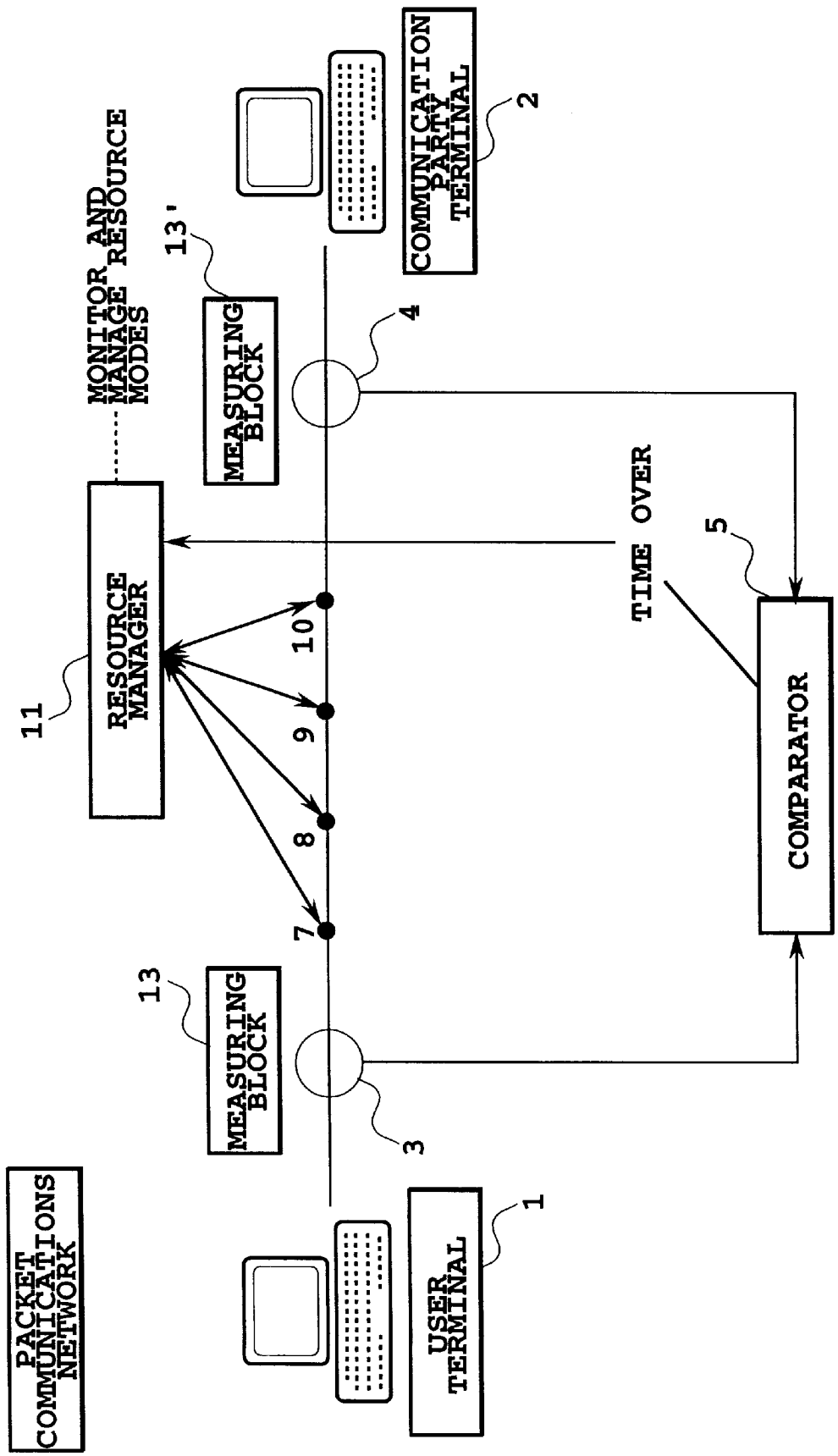
FIG. 6 is a block diagram showing a configuration of a packet communications network for implementing step-by-step resource control.

Once the network resources have been relinquished completely, a next packet communication request must reestablish the communication using available resources in the network. In view of this, a new mode can be provided in which the network resources are not completely relinquished, that is, the resources are temporarily reserved for facilitating the communication reestablishment as compared with the reestablishment by ordinary users who reestablish their communications using the available resources. FIG. 6 shows a configuration of the packet network for implementing this. In FIG. 6, a resource manager 11 is added to the network functions of FIG. 5.

In FIG. 6, the resource manager 11 always monitors resource conditions such as working rates of the resources in the network, their used conditions, their users and user conditions. Besides, the resource manager 11 measures a resource hold time period of each user.

The measuring blocks 13 and 13' monitor the packet exchange of each user, and sends the results to the comparator 5. The comparator 5 compares the time periods during which the packet is not exchanged with the reference time period, and if at least one of the time periods fed from the measuring blocks 13 and 13' exceeds the reference time period, the comparator 5 makes a decision that a time-over takes place, and transfers the control to the resource manager 11.

The resource manager 11 is connected to respective nodes in the network, and monitors the resource conditions. The resource manager 11, measuring the resource hold time period of each user and comparing the measured time period with the reference time period, can change the resource conditions in accordance with the time period. Providing a resource manager with such functions makes it possible to release the resources step by step and to reestablish communications effectively.

Figure 7:
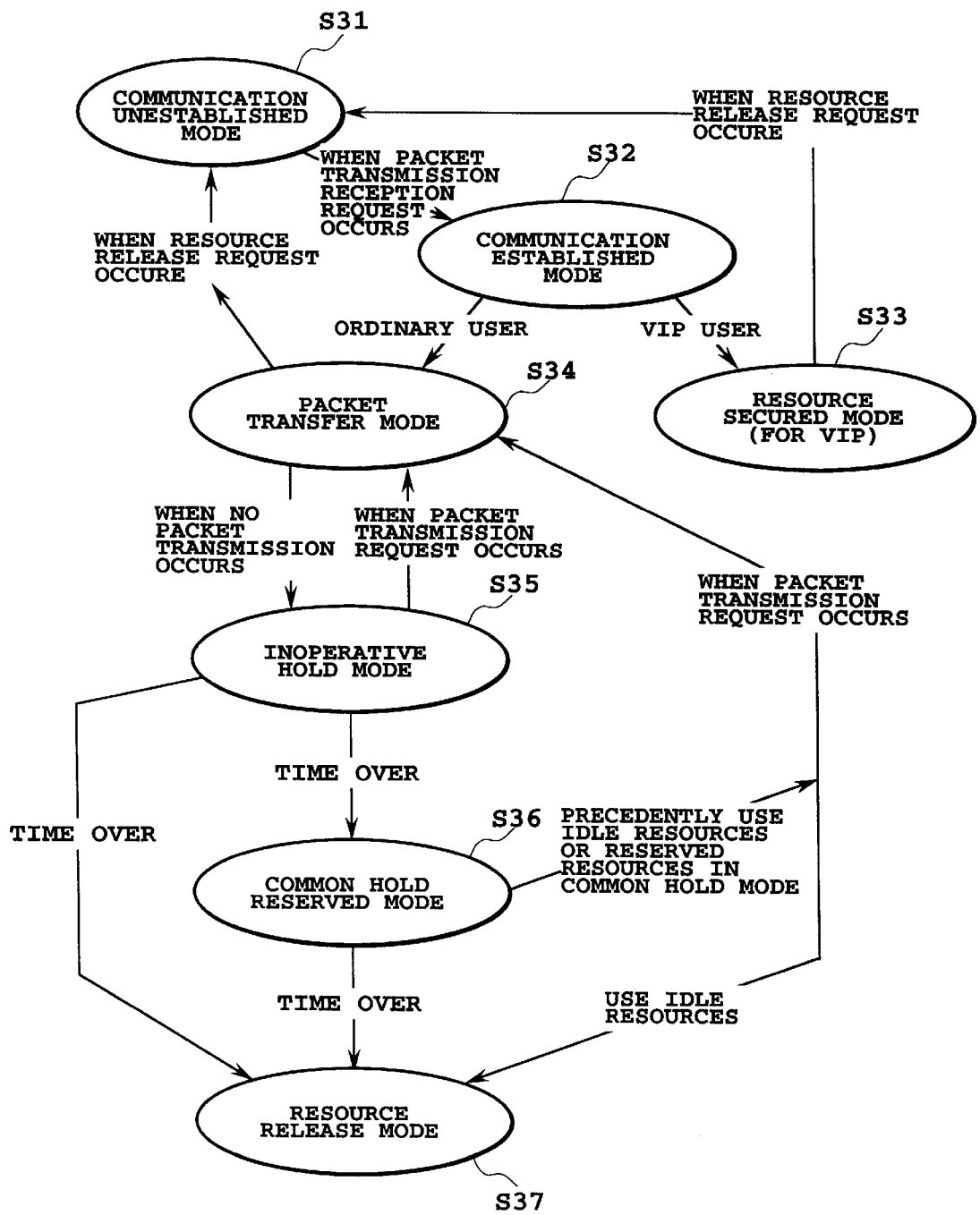
FIG. 7 is a state diagram illustrating state transition of resources in a network.

With the transition of the control from the comparator 5, the resource manager 11 can first place the resources in the hold mode by a command to the nodes 7–10. FIG. 7 is a state transition diagram illustrating the step-by-step control of the resources in the network.

Incidentally, the resource manager 11 and the comparator 5 can be installed in the same node or in different nodes. In addition, although the resource manager 11 measures the resource hold time period and the like in FIG. 6, the comparator 5 or the designator 6 in FIG. 5 can have the same functions as those of the resource manager 11 to manage the resource conditions in accordance with time.

The operation will now be described of the packet communications network with the configuration as shown in FIG. 6 with reference to the state transition diagram of FIG.

7 depicting the conditions of a user employing the packet network. In the following description, contents in parentheses each designate a mode of the user in the network as shown in FIG. 7.

In FIG. 7, a user who wants to use the packet communication, but has not yet established the communication (S31), establishes the communication by requesting the packet network to do so (S32). Since the communication establishment differs depending on the configuration of a network, and a method of establishing the communication is independent of the embodiment, the description thereof is omitted here.

When establishing the communication using the resources in the network, VIP users can be admitted besides ordinary users. The VIP users can precedently reserve resources in the network to establish their communications, and their resources are independent of the used conditions by other users so that the resources can be held until the VIP users relinquish the communication establishment.

When the VIP users are admitted, the process branches off from the communication established mode (S32) depending on whether the user is an ordinary user or a VIP user. In the case of the VIP user, the resources the user acquires are fixedly established (resource secured mode: S33). On the other hand, when the user is an ordinary user, the resources are placed in a packet transfer mode (S34).

When the user in the packet transfer mode (S34) does not exchange a packet, he or she enters an inoperative hold mode (S35). If this state continues until its time period exceeds the reference time period, the user enters a common hold reserved mode (S36).

The inoperative hold mode is measured by the measuring blocks 13 and 13'. The measured results are transferred to the comparator 5 to be compared with the reference time period of the inoperative hold mode, and if they exceed the reference time period, the resource manager 11 is notified of this to set the common hold reserved mode.

Entering the common hold reserved mode (S36), the user is entitled to use common hold resources shared by a plurality of users. When the user makes a transmission/ reception request in this state, the user not only can utilize the released (available) resources as other ordinary users, but also has a right to use the common hold resources, which ensures the user to set up the channel more positively than the other ordinary users who are not in the common hold reserved mode.

The common hold resources can be reserved in advance by a fixed amount in the network, or can be increased or decreased in accordance with the used conditions of the resources in the common hold reserved mode.

EXAMPLE 1

Increase the common resources with an increase of users in the common hold reserved mode.

EXAMPLE 2

Decrease the common resources when a user in the common hold reserved mode relinquishes the resources in the common hold reserved mode.

EXAMPLE 3

Decrease the common resources when a user in the common hold reserved mode enters the packet transfer mode using the resources in the common hold reserved mode.

In addition, the common resources can be divided into two or more levels and assigned to users in accordance with their priority in order to further discriminate the users in the reserved mode in the case where the resources are reduced.

Furthermore, as for a user who carries out little or no communications, the resources can be made free from management and the reserve can be released completely so that the resources are secured again, when a packet transfer request takes place, from among the available resources as in a new user, thereby tightening an amount of redundant common hold resources.

When sufficient amount of resources is prepared for the request of the users, the carrier of the network can simplify the resource management so that the inoperative hold mode can be immediately changed to a resource released mode with skipping the reserved mode.

This is depicted in FIG. 7 as a direct route proceeding from the inoperative reserved mode (S35) to the resource released mode (S37).

The resource released mode (S37) is a state into which a transition is made directly from the inoperative hold mode (S35), or from the common hold reserved mode (S36) when the reference time period is exceeded. In this mode, the resources associated with the user in the network are entirely released, and become idle resources available by any user from then on. When the next transmission/reception request takes place, a channel must be set up again using available resources in the network as in the case of a new user.

Here, it is important to consider a resource assignment method during busy hours of the network resources when an increasing number of users exchange packets.

Figure 8:
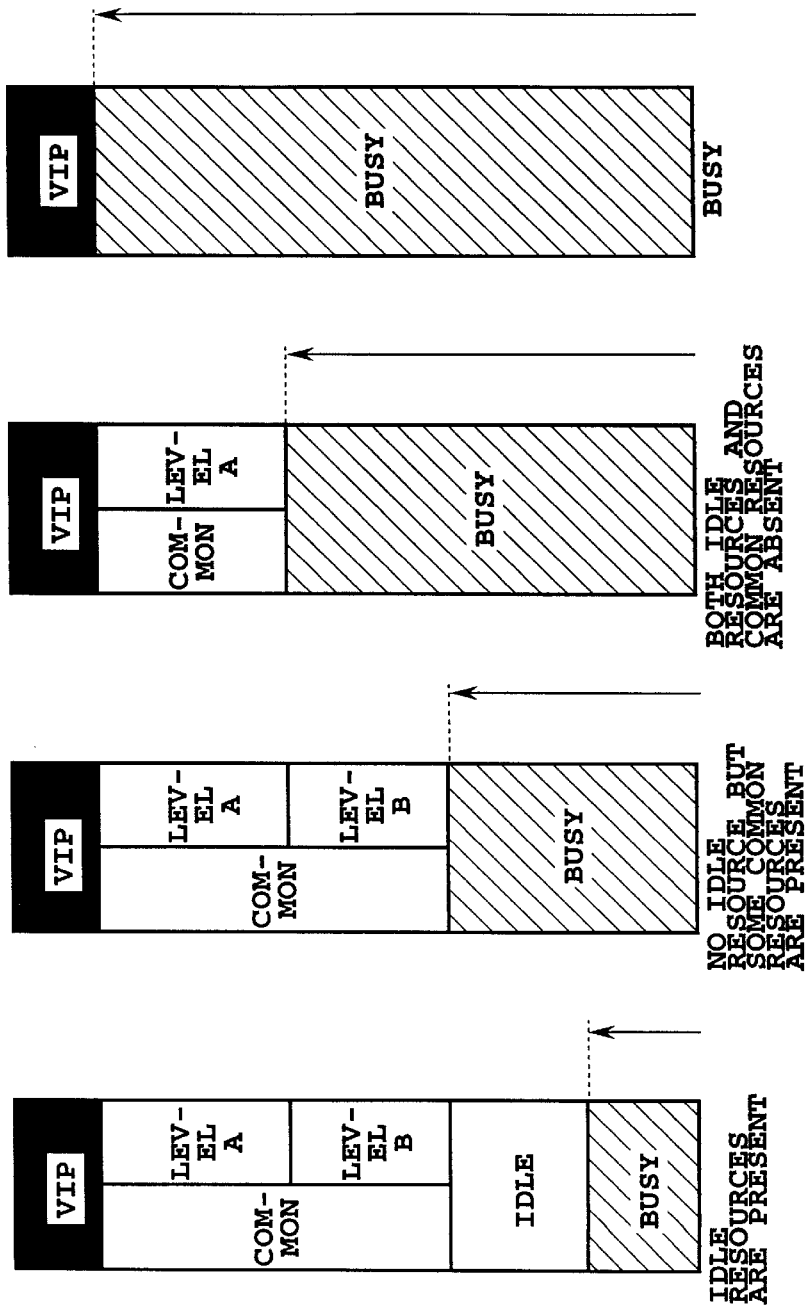
FIGS. 8A to 8D are diagrams illustrating control of resources in the network.

FIG. 8 is a diagram illustrating states when an increasing number of resources in the network gradually become busy, in the case where the system in FIG. 4 controls the common resources at two levels (levels A and B).

FIG. 8A depicts a state in which available resources are present. In this case, an ordinary user basically use available resources in the network when establishing a communication using the resources in the network. In FIG. 8A, the user in the common hold reserved mode can establish a communication using either the idle resources or the common hold reserved resources.

FIGS. 8B and 8C each illustrate a state in which there is no idle resources, but some leeway of the common hold resources for the common hold users to return to the packet transfer mode (FIG. 8B illustrates a case when there is leeway for the common hold users at both levels A and B, and FIG. 8C illustrates a case when there is leeway only for the common hold users at level A). In FIGS. 8B and 8C, ordinary users are placed in a busy state.

In FIG. 8B, the users at level A can use the common hold resources at level A, and the users at level B can use the common hold resources at level B. In FIG. 8C, although the users at level B become busy, the users at level A are allowed to secure their resources from among the common hold resources at level A.

When an increasing number of users make use of the resources in the network from the state as shown in FIG. 8C, and a state as illustrated in FIG. 8D arises in which the ordinary users and the common hold users are making use of all the resources, a packet transmission/reception request from a new user is placed in the "busy state" until idle resources become available regardless of whether the new user is an ordinary user or a common hold user, and the packet exchange is permitted using the resources in the network when they become available.

In the complete "busy state" as illustrated in FIG. 8D, the user will perceive that his or her resources are temporarily released (that the communication establishment is released).

A user who wishes the environment allowing incessant packet exchange must become a VIP user.

The control method enabling the communication resources to possess the hold mode in the packet communications network is also applicable to the packet communication in the mobile communications network (mobile packet communications network). Such an example will now be described with reference to FIG. 9. The mobile communications network is characterized in that a terminal of at least one of the peer users can move, which will be described mainly here.

Figure 9:
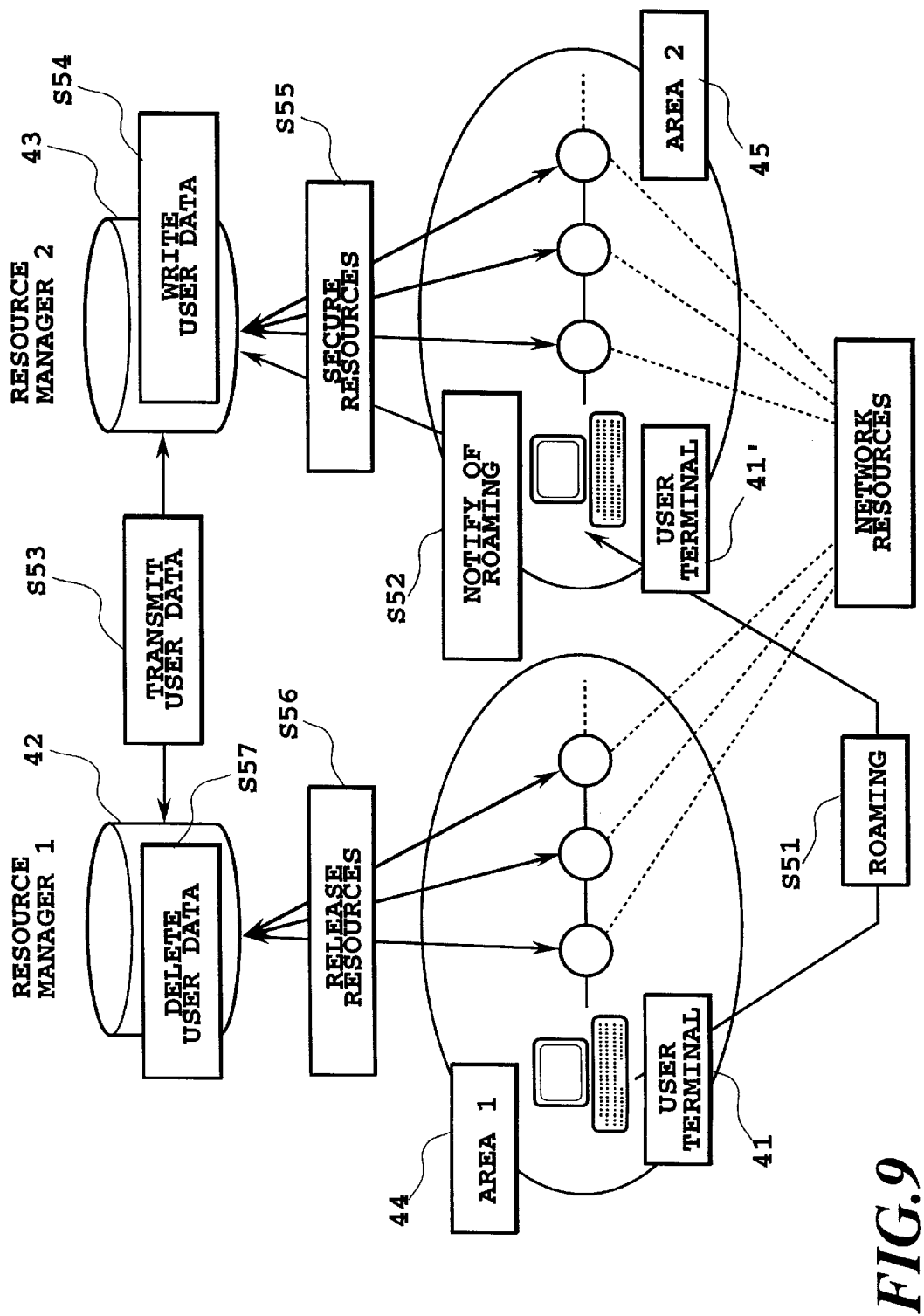
FIG. 9 is a block diagram showing an example of a mobile communications network to which the present invention is applied.

In the mobile packet communications network as shown in FIG. 9, a case will be described in which a user in the common hold reserved mode (see, S36 of FIG. 7) moves into another location, and hence the communication must be set up again, that is, the resources must be reestablished at the new location. In this case, the resources secured before the movement must be made available in the new location.

The mobile packet communications network as shown in FIG. 9 requires, in addition to the packet communications network as shown in FIG. 6, a configuration for managing the resources even when its user moves into another cell. This is implemented by a resource manager 1 42 and a resource manager 2 43.

When a user terminal 41 moves from a cell (not shown) in a current area 1 44 to another cell (not shown) in an area 2 45 (S51), the user terminal 41' notifies the resource manager 2 43 managing the area 2 45 that it moves to the area 2 45 (S52). This information is supplied from a base station (not shown) constituting the cell to an intra-network node in which the resource manager 2 43 is installed through a service control point (SCP, not shown). The resource manager 2 43 is connected with the resource manager 1 42 managing the area 1 44. Thus, the resource manager 2 43 can transfer information about the user terminal 41' from the resource manager 1 42 (S53), and write the information (S54). In addition, the resource manager 2 43 secures the resources in the network in accordance with the user information (S55). The resource manager 1 42 relinquishes the resources which the user has secured and become unnecessary in the old area, and deletes the user information (S56). Having such functions in the network makes it possible to decide a section in which the resources are released. All the above-mentioned functions can be installed in any node.

The foregoing operation enables efficient use of the resources in the mobile packet communications network.

Figure 10:
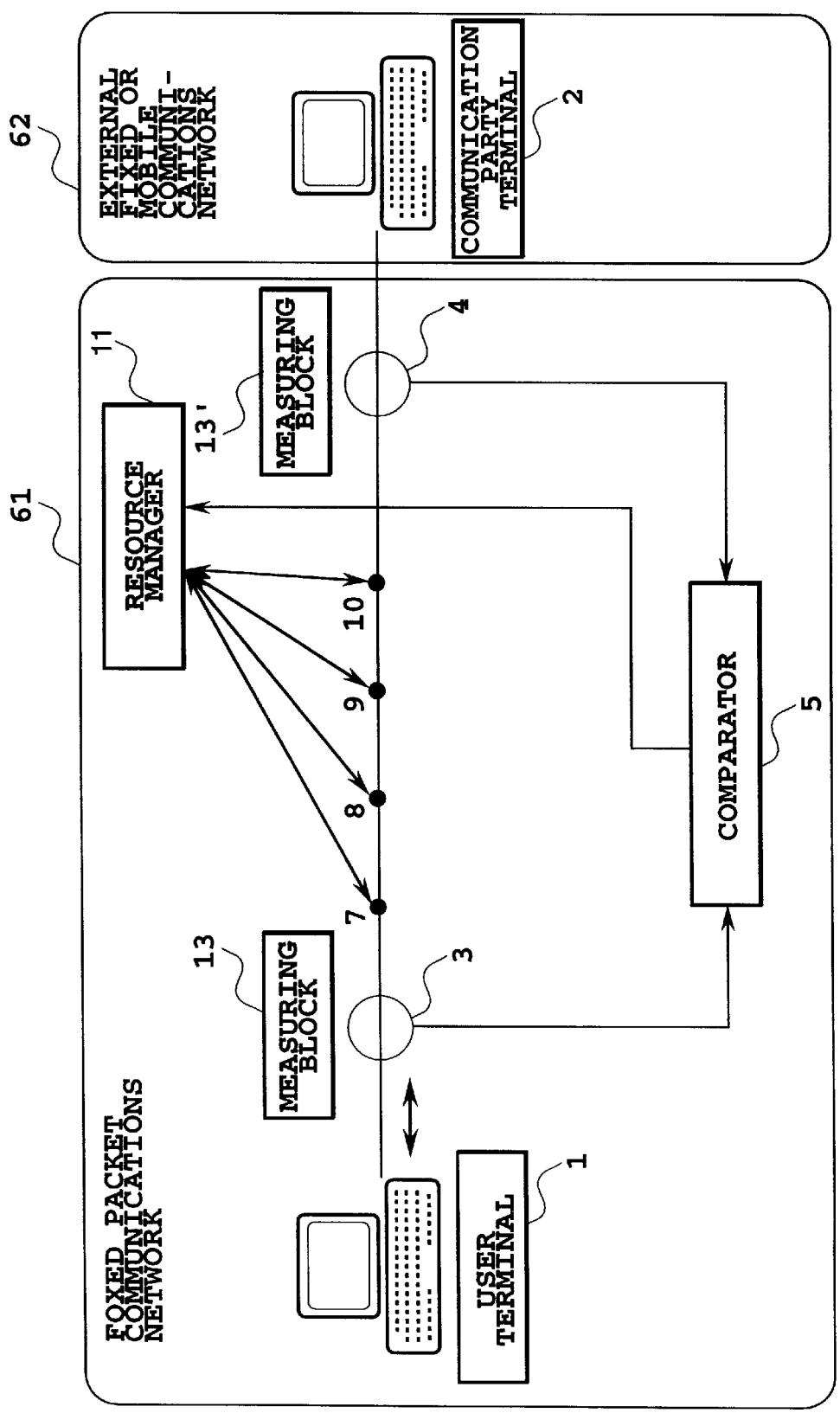
FIG. 10 is a block diagram showing connections of a fixed packet communications network with an external network.

FIG. 10 shows an example for implementing communications by connecting the fixed packet communications network as shown in FIG. 5 or 6 with a packet communications network (including the above-mentioned mobile communications network). In this case, the measuring block 13' is installed in the node 4 at the interface with the external network.

The measuring blocks 13 and 13' each measure the packet exchanged time period to or from the user terminal 1, the unexchanged time period, and the number of bytes of the packets, and supplies the comparator 5 with the measured results. The comparator 5, which has the prestored reference time period, compares the packet unexchanged time period with the reference time period. If the unexchanged time period exceeds the reference time period, the comparator 5 notifies the resource manager 11 of that. The resource manager 11 commands each node to relinquish the resources in response to the information supplied. The nodes 7, 8, 9 and 10 release the network resources the user uses in accordance with the command.

[COMMUNICATION ESTABLISHMENT]

The description of the procedure of establishing a communication in the network will be omitted here because the normal procedure is used. Assume that the user has established a communication, and is in the communication established mode. In other words, it is assumed that a communication path has been established from the user terminal to the party terminal in FIG. 6 (1-3-7-8-9-10-4-2) so that a packet can be transferred at any time (although the mode in which no packet is exchanged continues).

[TRANSITION TO COMMUNICATION HOLD MODE]

The measuring blocks 13 or 13' in the network measures the traffic of the packet communication of the user, and transfers the measured data to the comparator 5.

The comparator 5 compares the packet unexchanged time period sent from the measuring block 13 with the reference time period. The reference time period is a predetermined fixed value like "10 minutes", for example, which is prestored in the comparator 5. If the packet unexchanged time period of the user exceeds the reference time period of 10 minutes, the comparator 5 notifies the resource manager 11 of this.

When relinquishing the resources in the network step by step, the resource manager 11 monitors their modes, and sets their modes in the common reserved mode when the resource manager 11 learns that a release command is issued to the resources the user holds in the network. When the user requests a packet exchange in this state, the communication can be reestablished using idle resources or the common reserved resources the user holds in the network. On the other hand, when the reserved mode exceeds 10 minutes without the user's exchange of a packet, the resource manager 11 relinquishes the associated resources completely. Repeating such procedures can make effective use of the resources in the network. When no step-by-step management of the resources is carried out, they are released in the configuration as shown in FIG. 5.

Next, a control procedure of the network resources of a mobile network user in the inoperative hold mode will be described in more detail with reference to FIG. 11.

[NETWORK CONFIGURATION]

Figure 11:
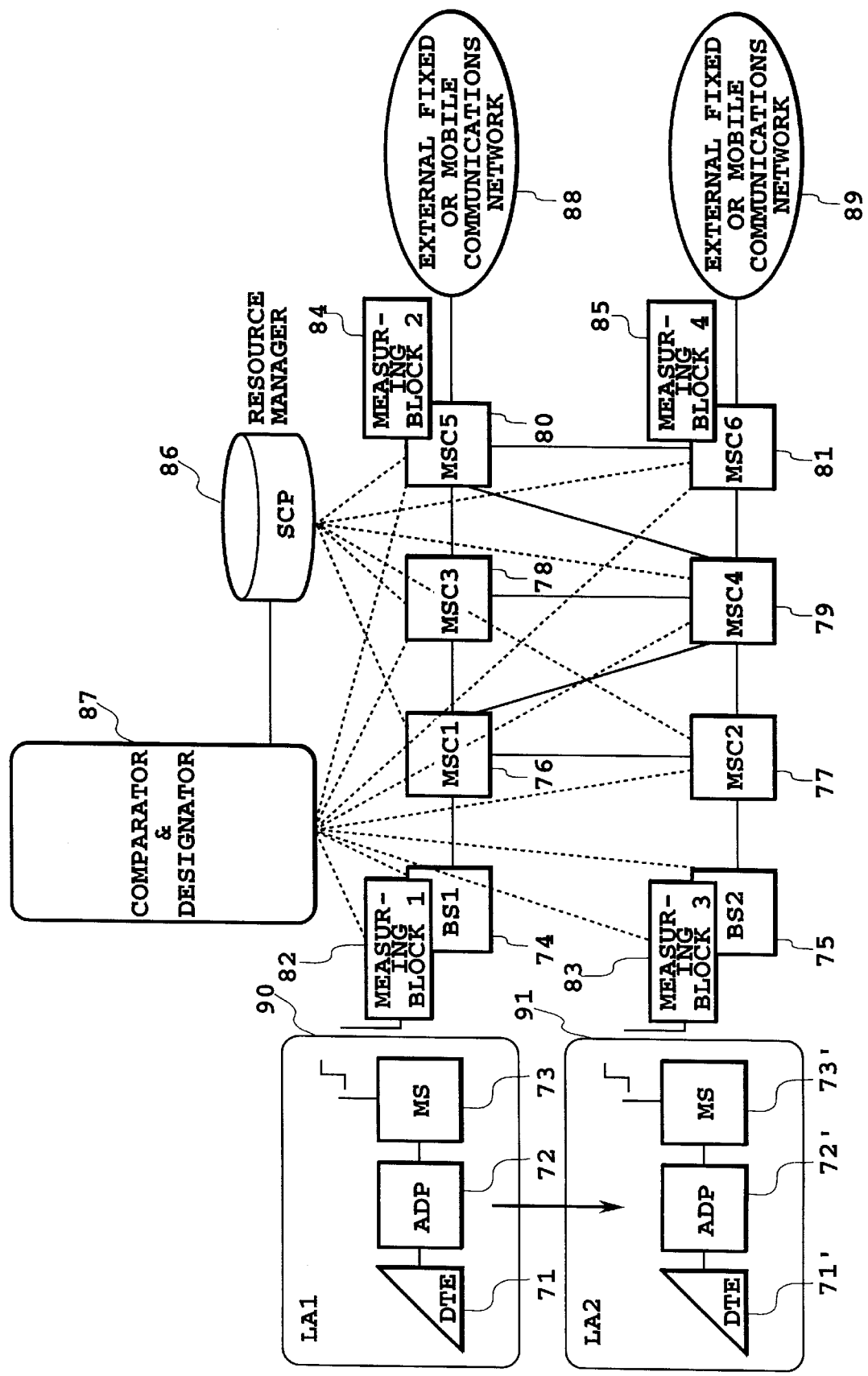
FIG. 11 is a block diagram showing a detailed configuration of a mobile communications network.

FIG. 11 shows a mobile packet communications network, in which reference symbols DTE designates a user packet communications terminal 71; ADP designates a connection adapter 72; MS designates a mobile station 73; BS designates a base station 74 or 75; MSC designates one of switching centers 76–80; and SCP designates a service control point 86. The mobile packet communications network in accordance with the present invention includes measuring blocks 82, 83, 84 and 85, and a comparator & designator 87 as new nodes which are not included in the mobile packet communications network so far.

The base station BS1 74 has radio access to a cell 1 20 (where cell designates a radio area), and the base station BS2 75 to a cell 2 21. The switching centers MSC1 76 and MSC2 77 are connected with the base stations BS 74 and 75, respectively.

The switching centers MSC3 78 and MSC4 79 transit the information the switching centers MSC1 76 and MSC2 77 collect. The switching centers MSC5 80 and MSC6 81 operate as a gateway to an external network. Although the switching centers MSCs are basically the same in that they switch information, they operate as a subscriber, transit or gateway switching center in accordance with their position in the network (although these functions can be integrated into a plurality of switching centers in accordance with the network configuration).

Each base station can accommodate and aggregate a plurality of mobile stations, each subscriber switching center a plurality of base stations, each transit switching center a plurality of subscriber switching centers, and each gateway switching center a plurality of transit switching centers. In addition, the subscriber switching center can aggregate any given base stations.

The service control point SCP 86 stores user information for service control and location information of mobile stations. In addition, the service control point SCP includes the resource managers collectively. The resource managers each accumulate information about the state of the resources currently providing services to users in the network.

The measuring blocks 81–84 and the comparator & designator 87 have the same functions as their counterparts of the fixed packet communications network as shown in FIG. 5.

[COMMUNICATION ESTABLISHMENT]

The procedure of establishing a communication in the network is the same as the procedure described before. The procedure establishes a communication path from the user terminal to an external fixed or mobile network, enabling a packet to be transferred at any desired time.

It is assumed here that the communication is established through a path along the terminal DTE-connection adapter ADP-mobile station MS-measuring block 1-base station BS1-switching center MSC1-switching center MSC3-switching center MSC5measuring block 2-external fixed or mobile network (71-72-73-82-74-76-78-80-84-88).

[TRANSITION TO COMMUNICATION HOLD MODE]

As for the transition to the communication hold mode, its procedure is identical to that of the embodiment 1. The measuring block 1 or 2 (82 or 84) in the network measures the traffic of user packets.

When the user continues the inoperative hold mode, the comparator 87 compares the reference time period with the packet unexchanged time period of the user included in the data sent from the measuring block 1 or 2 (82 or 84). In response to the compared result and taking account of the priority and the like, the designator provides the nodes (74, 76, 78 and 80) in the network with a command to change the state of the network resources held by the user (which corresponds to the function of the resource manager 11 in FIG. 2). Thus, the state shifts to the reserved mode and then to the released mode. When the user sends an outgoing/incoming request of a packet, the channel is reestablished in accordance with the mode.

The packet communications of the mobile network differs greatly from that of the fixed network in that the communication path must be changed through the handover in conjunction with the roaming of the user terminal. Its handling will be described below.

[COMMUNICATION HOLD MODE AFTER HANDOVER]

Assume that the user in the inoperative hold mode moves into another area: for example, the user terminal 90 in FIG. 11 moves from the cell 1 20 to the cell 2 21. In addition, assume that the communication path is established in this case, as an extreme example, along the terminal DTE-connection adapter ADP-mobile station MS-measuring block 3-base station BS2-switching center MSC2-switching center MSC4-switching center MSC6-measuring block 4-external fixed or mobile network (71'-72'-73'-83-75-77-79-81-85-89). It is obvious that the communication paths and nodes to be changed are limited depending on the node configuration in the network, the connection relationship with the external network, and an amount of movement of the roaming user.

Although the communication resources are secured and established through the normal handover in the packet transfer mode and the inoperative hold mode, a takeover of a resource management mode is carried out in the reserved mode as described below (although the takeover of the resource management mode of the node can be skipped when the common hold resource management is performed as described before).

The service control point 86 sends a resource reserve request based on the user information it manages to the new nodes (75, 77, 79 and 81) involved in the new communication establishment in the handover destination so that the resources of the roaming user is secured in the new nodes.

At the same time, the reserved resources in the handover source are relinquished. When the resources cannot be secured which satisfy the requirements of the user in the new nodes (75, 77, 79 and 81), the following steps are taken.

1. The resources in the handover destination are secured by lowering the level of the roaming user.
2. The resources are secured by waiting until they become available by setting a resource reserve waiting mode until sufficient idle resources take place in the handover destination nodes.
3. The foregoing two methods are combined so that available resources are sequentially reserved, and the shortages are secured by the reserve waiting.
4. The needed amount of resources is obtained finally.

The above steps enable effective use of the resources in the network, and provide the resource management well fit to the changes of the communication path involved in the user roaming.

Next, the control for determining the reference time period will be described in detail.

In the operation of the configuration as shown in FIG. 5, for example, the measuring blocks 13 and 13' provide the comparator 5 with the measured data about the time period in which no packet is transmitted. The comparator 5 compares the time period in which the packet is not transmitted with the reference time period, and when the former exceeds the latter, the comparator notifies the designator 6 of the time over. The designator 6 sends to the resource releasers 12 of the nodes 7–10 the command to release the resources of the user. The releasers 12 of the nodes relinquish the resources of the user designated. The released resources in the network become available for other users, which enables the effective use of the resources. The released resources in the network are acquired again at the start of the packet communication by a user.

[DETERMINATION OF REFERENCE TIME PERIOD]

The reference time period the comparator 5 in FIG. 5, for example, uses for comparison will be described here. The following methods are applicable to determine the reference time period the comparator 5 uses.

(1) Use a single fixed value in common to all the users.
(2) Use a fixed value that is set for each user.
(3) Designate on the user side one of fixed values determined in advance.
(4) Set a variable value for each user in accordance with the frequency the user carries out the communications.
(5) Set a single variable value in common for all the users by considering on the network side the working rate of the resources in the network.

The setting methods of the reference time period will now be described in more detail.

[SINGLE FIXED VALUE]

When using a single fixed value in common to all the users, the comparator 5 of FIG. 5, for example, stores the fixed value to be used.

[FIXED VALUE SET FOR EACH USER]

Figure 12:
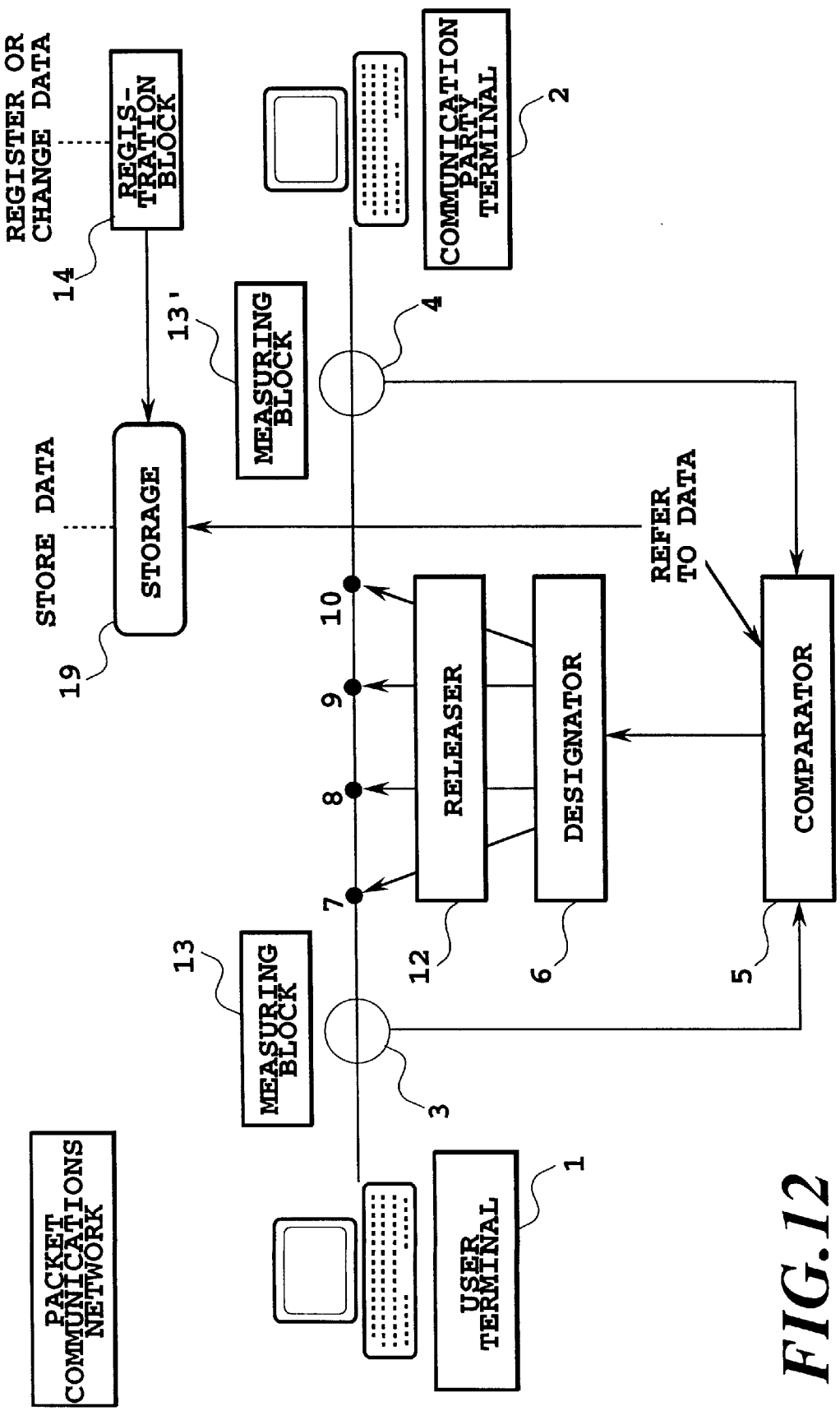
FIG. 12 is a block diagram showing a configuration capable of establishing a reference time period for each user.

A configuration is shown FIG. 12 of the packet communications network for implementing the use of the fixed value that is set for each user as the reference time period.

FIG. 12 shows a packet communications network that registers a predetermined reference time period for each user, stores the reference time periods, and refers to the reference time periods as needed.

The configuration of FIG. 12 includes a registration block 14 and a storage 19, which are newly added to the network functions of FIG. 5. The registration block 14 registers to, changes in and deletes from the storage 19 the reference time period determined for each user. The storage 19 stores the reference time periods.

Furthermore, the storage 19 is connected to the comparator 5 which has a new function of referring to the reference time periods as needed. Providing the network with these function enables the fixed reference time period to be set for each user. It is preferable that the storage 19, the registration block 14 and the comparator 5 belong to the same node.

The operation in FIG. 12 will now be described. The packet unexchanged time period of a particular user measured by the measuring block 13 or 13' is compared by the comparator with the reference time period of the user read from among the reference time periods stored in the storage 19. The subsequent operation is the same as that described in connection with FIG. 5.

[DESIGNATION FROM AMONG SEVERAL FIXED VALUES]

Figure 13:
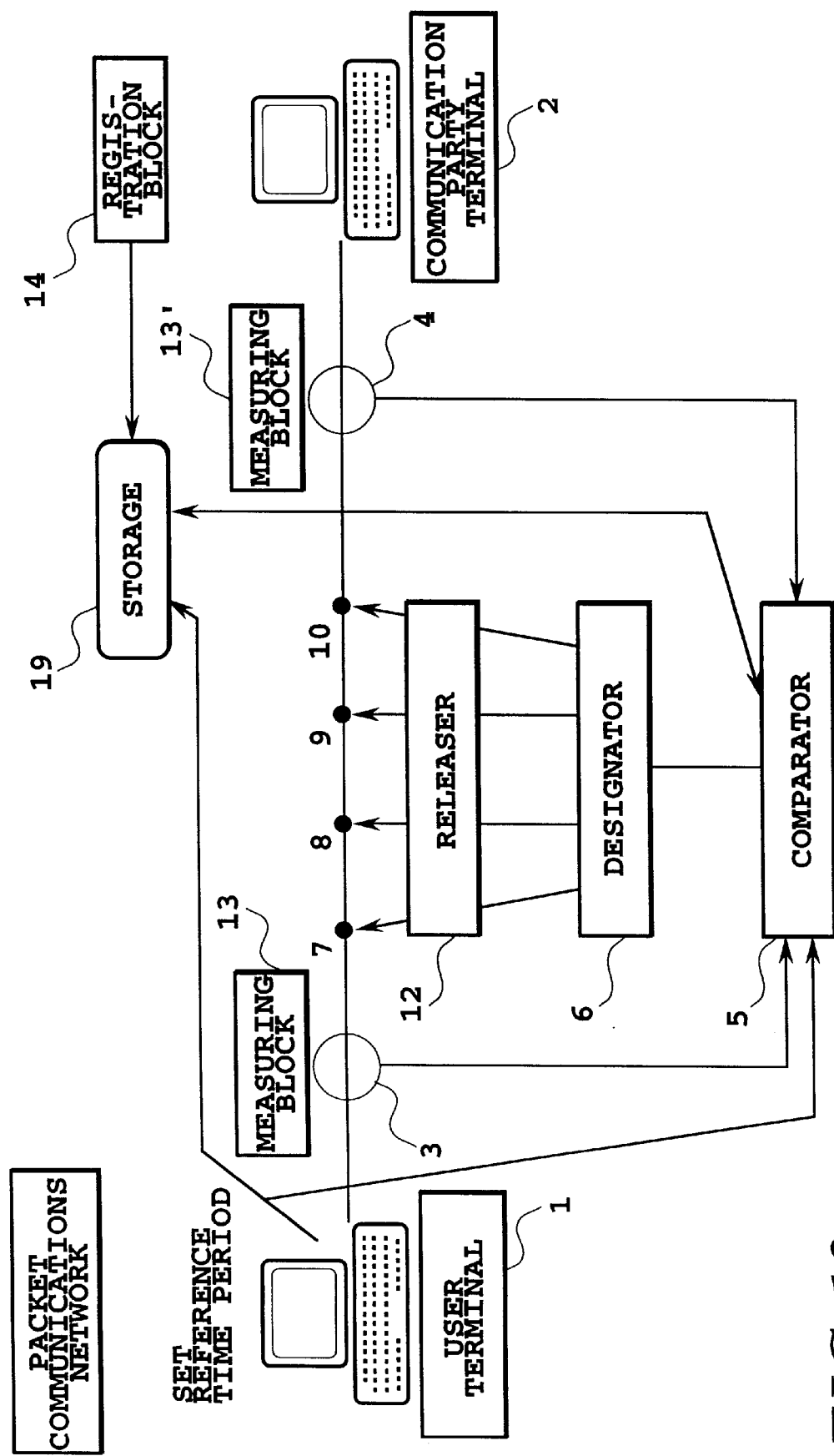
FIG. 13 is a block diagram showing a configuration allowing a user to designate the reference time period.

A configuration of the packet communications network that can designate the reference time period from among several fixed values is shown in FIG. 13. FIG. 13 shows a packet communications network enabling a user to rewrite the stored reference time period by designating his or her reference time period.

In FIG. 13, the user terminal 1 has a new function of rewriting the reference time period stored in the comparator 5 or storage 19 by designating one of the predetermined reference time periods. Having this function, the network can set the reference time period variable from user to user.

The operation in FIG. 13 will be described. In FIG. 13, the user using the user terminal 1 designates one of the reference time periods the registration block 14 can set in the storage 19. The designated result can be sent either to the storage 19 or to the comparator 5. When it is sent to the storage 19, the storage 19 must transfer the selected reference time period to the comparator 5. The subsequent operation using the designated reference time period is the same as that described before.

[VARIABLE VALUE IN ACCORDANCE WITH FREQUENCY OF USE]

Figure 14:
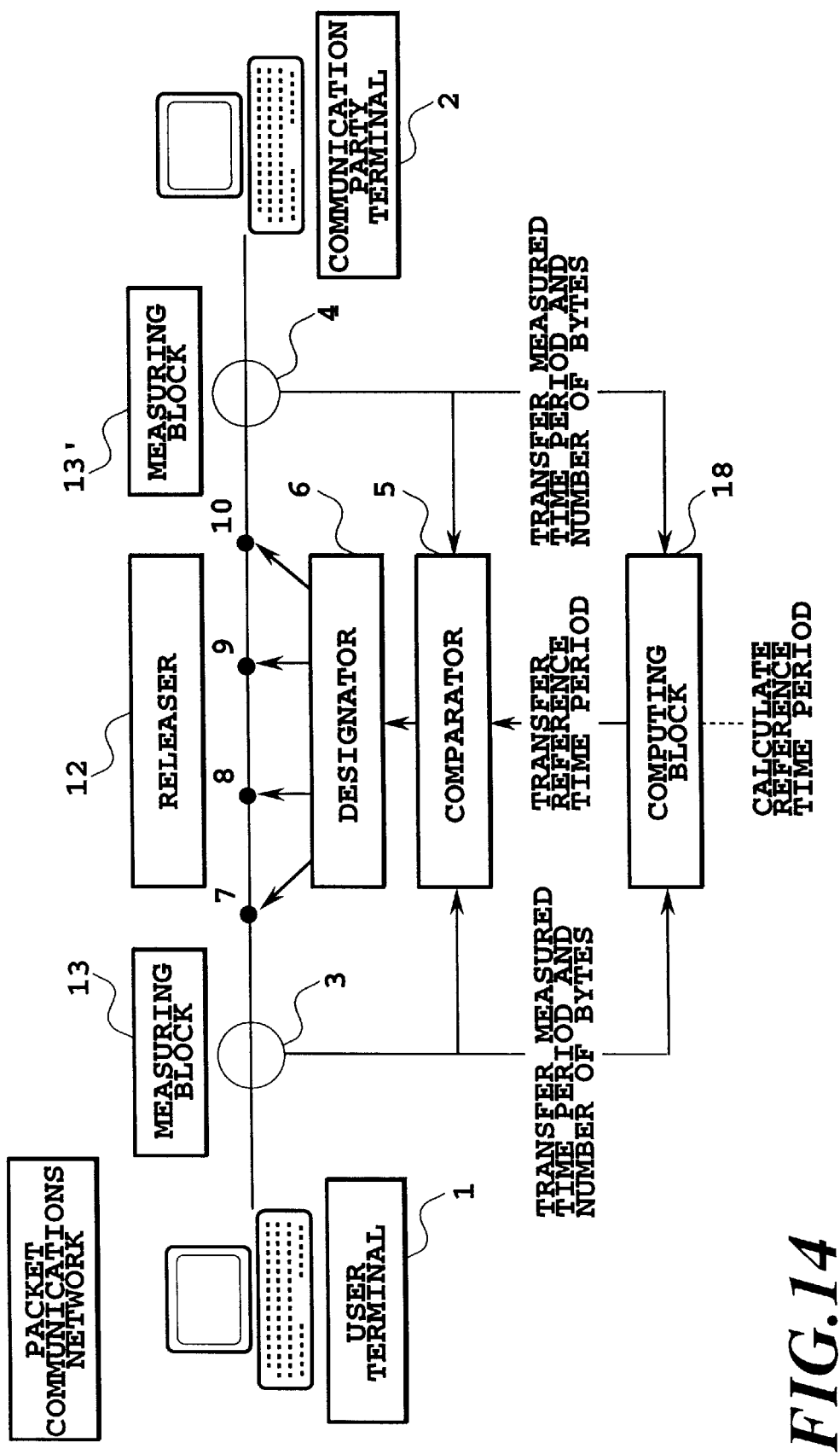
FIG. 14 is a block diagram showing a configuration capable of establishing the reference time period in accordance with the frequency of communications.

A configuration of the packet communications network using variable values in accordance with the frequency of used is shown in FIG. 14.

FIG. 14 shows a packet communications network that measures the frequency each user uses the packet communications, and calculates from the measured results the reference time period for each user.

In FIG. 14, a computing block 18 is newly provided in addition to the functions of the network as shown in FIG. 5. The measuring block 13 or 13' has, in addition to the functions of measuring the packet exchanged and unexchanged time periods, a new function of measuring the number of bytes of the packet exchanged. Furthermore, the measured block 13 or 13' is connected to the computing block 18, and transfers the measured data to the computing block 18. The computing block 18 calculates the reference time period for each user by using the data transferred. In addition, the computing block 18 is connected to the comparator 5, and transfers the calculated data to the comparator 5. Having these functions, the network can set the variable reference time period for each user. It is preferable that the computing block 18 be installed in the same node as the comparator and the like.

Next, the operation of the configuration in FIG. 14 will be described. The measuring block 13 or 13' notifies the computing block 18 of the measured time periods (packet exchanged time period and unexchanged time period) and the number of transmitted bytes. Receiving the data, the computing block 18 calculates the frequency of use by each user (percentage of the time period of use, or data volume transferred, for example), and determines from these data the reference time period, such as increasing the reference time period for a user with high frequency of use. Receiving the reference time period, the comparator 5 compares it with the unexchanged time period fed from the measuring block. The subsequent operation is the same as that of the foregoing configurations.

[SINGLE VARIABLE VALUE IN ACCORDANCE WITH WORKING RATE OF RESOURCES]

Figure 15:
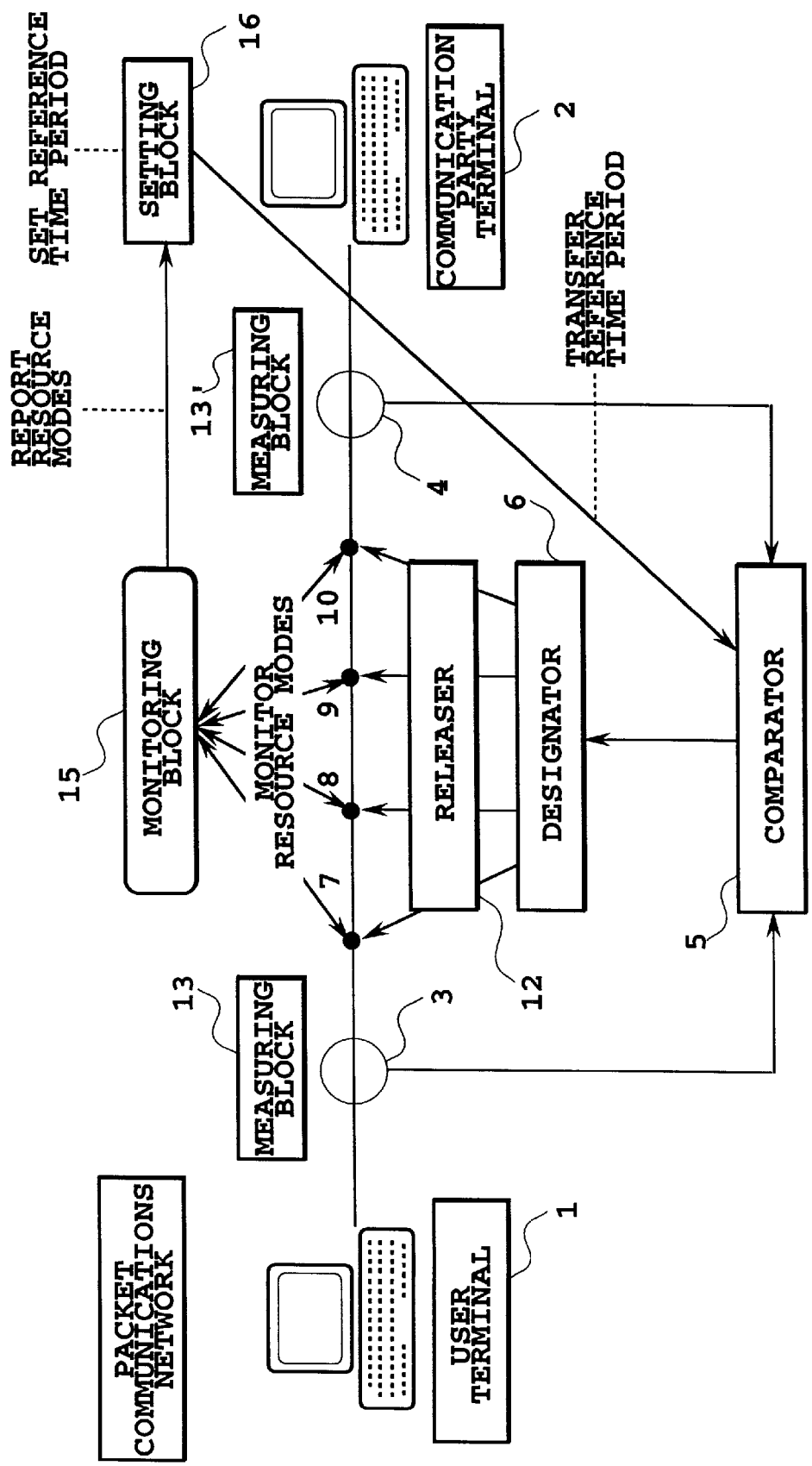
FIG. 15 is a block diagram showing a configuration capable of establishing the reference time period in accordance with the working rate of resources.

A configuration of the packet communications network using a single variable value in accordance with the working rate of the resources is shown in FIG. 15.

FIG. 15 shows a packet communications network which monitors the working rate of the resources in the network, and can set the reference time period in accordance with the working rate.

In FIG. 15, a monitoring block 15 and a setting block 16 are newly provided in addition to the network function of FIG. 5. The monitoring block 15 is connected to the resources in the network to monitor their working rates. Furthermore, the monitoring block 15 is connected to the setting block 16, and sends to the setting block 16 the data obtained by the monitoring. Receiving the data, the setting block 16 sets the reference time period using the data. Moreover, the setting block 16 is connected to the comparator 5, and supplies the comparator 5 with the measured data. Having these functions, the network can set the common single variable reference time period. It is preferable that the monitoring block 15 and the setting block 16 be installed in the same node as the comparator 5.

The operation of the configuration as shown in FIG. 15 will now be described. The monitoring block 15 monitors the working rates of the resources in the network. An increase in the working rates results in the reduction in the common single reference time period, which in turn provides such control that releases the resources quickly. This enables the efficient use of all the resources in the network.

Taking account of the frequency of use of each user as described above, the control of the common single reference time period can be combined with the control of the reference time period for each user. Furthermore, such control can be implemented in which users can forcedly set the reference time periods for release, and those reference time periods are kept invariable.

In addition, it will be understood by those skilled in the art that the foregoing reference time period control methods can be applied to the reference time period used by the examples as shown in FIGS. 6, 7 and 8A–8D which have a plurality of released modes.

[RESOURCE RELEASE SECTION]

Next, the section in which the resources are relinquished will be described. The release of the resources can be carried out over the entire section, or in any given section. There are some methods for determining the section in which the resources are relinquished.

(1) The network resources are each released in a prescribed sequence and timing.

(2) The sequence and timing to release the resources are decided and set in the network in accordance with the working rates of the resources in the network.

The setting steps of the section in which the resources are released will be described below.

[RELEASE RESOURCES IN PRESCRIBED SEQUENCE AND TIMING]

Figure 16:
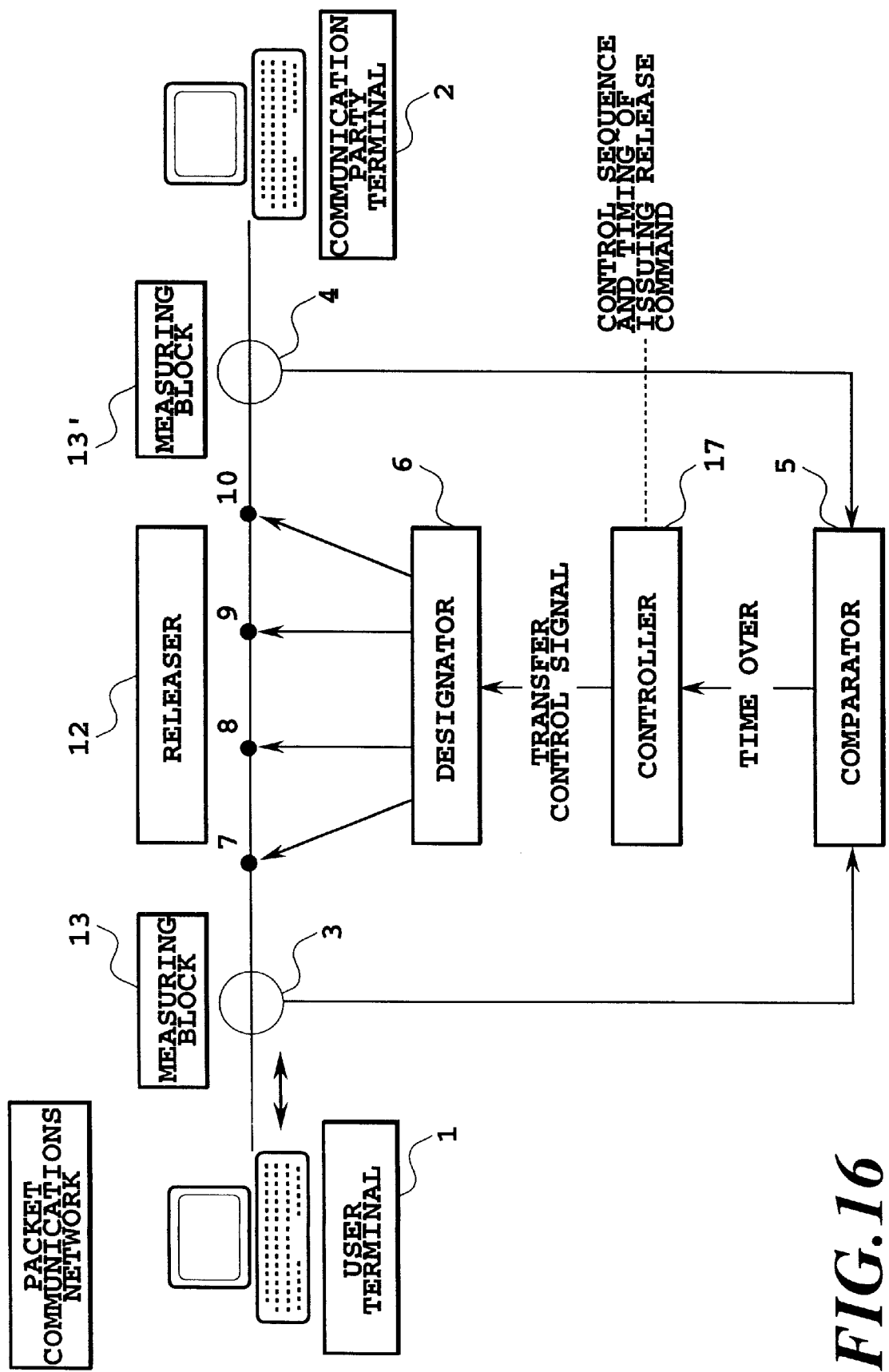
FIG. 16 is a block diagram showing a configuration capable of releasing the resources at a prescribed sequence and timing.

A configuration of a packet communications network for implementing this is shown in FIG. 16.

FIG. 16 shows a packet communications network that can achieve control for releasing the network resources in the prescribed sequence and timing.

In FIG. 16, a controller 17 is newly added to the network function as shown in FIG. 5. The controller 17 is connected to the comparator 5.

The comparator 5 notifies the controller 17 that the packet unexchanged time period exceeds the reference time period. The controller 17 controls the sequence and timing of releasing the resources in the network. In addition, the controller 17, which is connected to the designator 6, sends to the designator 6 the sequence and timing of releasing. The designator 6 provides the releasers 12 in the nodes 7–10 with the command to release the resources. Having these functions, the network can decides the section in which the resources are released. The functions of the controller can be included in the designator 6.

The operation of the configuration as shown in FIG. 16 will now be described. The measuring block 13 or 13' measures the packet communications between the user terminal 1 and the communication party 2, and the comparator 5 compares the measured time period with the reference time period as described above. When the packet unexchanged time period exceeds the reference time period, the comparator 5 sends to the controller 17 a time-over signal. The controller 17 determines the procedure of releasing the resources in the section, and notifies the designator 6 of the sequence and timing of the release. The notification can be performed by transferring them either in sequence or in batch, in which case, the designator 6 sequentially provides the command of releasing to the releasers 12 of the nodes in accordance with the information sent.

In this way, the resources can be released sequentially beginning from a section including a node with the high frequency of use, thereby improving the efficiency of using the network.

[SET SEQUENCE AND TIMING OF RELEASE IN ACCORDANCE WITH WORKING RATES OF RESOURCES]

A configuration of a packet communications network for implementing this is shown in FIG. 7.

Figure 17:
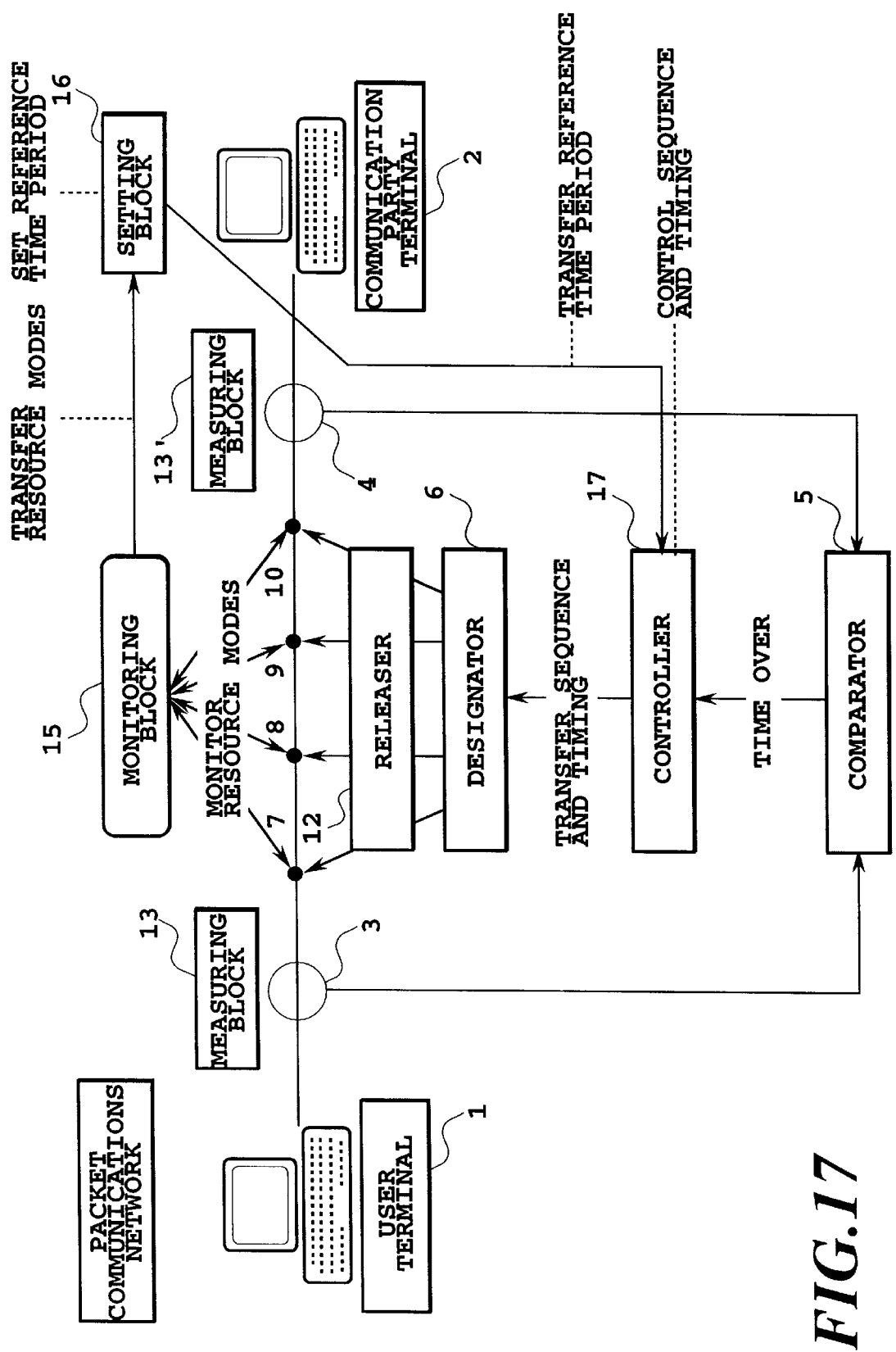
FIG. 17 is a block diagram showing a configuration capable of establishing a sequence and timing for releasing the resources in accordance with a working rate of the resources.

FIG. 17 shows a combination of the packet communications networks of FIGS. 15 and 16.

In FIG. 17, the monitoring block 15 is connected with the resources in the network, and monitors the working rates of the resources. In addition, the monitoring block 15 is connected to the setting block 16, and transfers the monitor data to the setting block 16. Using the data transferred, the setting block 16 determines the sequence and timing of the command for releasing. Furthermore, the setting block 16, which is connected with the controller 17, provides the controller 17 with the sequence and timing of the command for releasing. The controller 17 controls the command for releasing the resources in accordance with the sequence and timing transferred. In addition, the controller 17, which is connected to the designator 6, provides the designator 6 with the sequence and timing of releasing the resources. Including these functions, the network can decide the section in which the resources are released.

The operation of the configuration of FIG. 17 will now be described. In FIG. 17, the user terminal 1 is performing packet communications with the party terminal 2. The monitoring block 15 is monitoring the use conditions of the network resources. When the packet unexchanged time period measured by the measuring block 13 or 13' exceeds the reference time period set by the setting block 16, the comparator 5 provides the controller 17 with the time-over signal. The controller 17 commands the designator 6 in accordance with the sequence and timing of the release determined by the setting block 16, to release the network resources through the releasers 12.

[RELEASE OF RESOURCE]

A method will now be described for releasing each resource in a set of resources. There are following methods of releasing each of the resources.

(1) Release the entire set of resources in a batch.

(2) Release each of the resources at separate timing. These will be described in more detail.

[RELEASE THE ENTIRE SET OF RESOURCES IN A BATCH]

Figure 18:
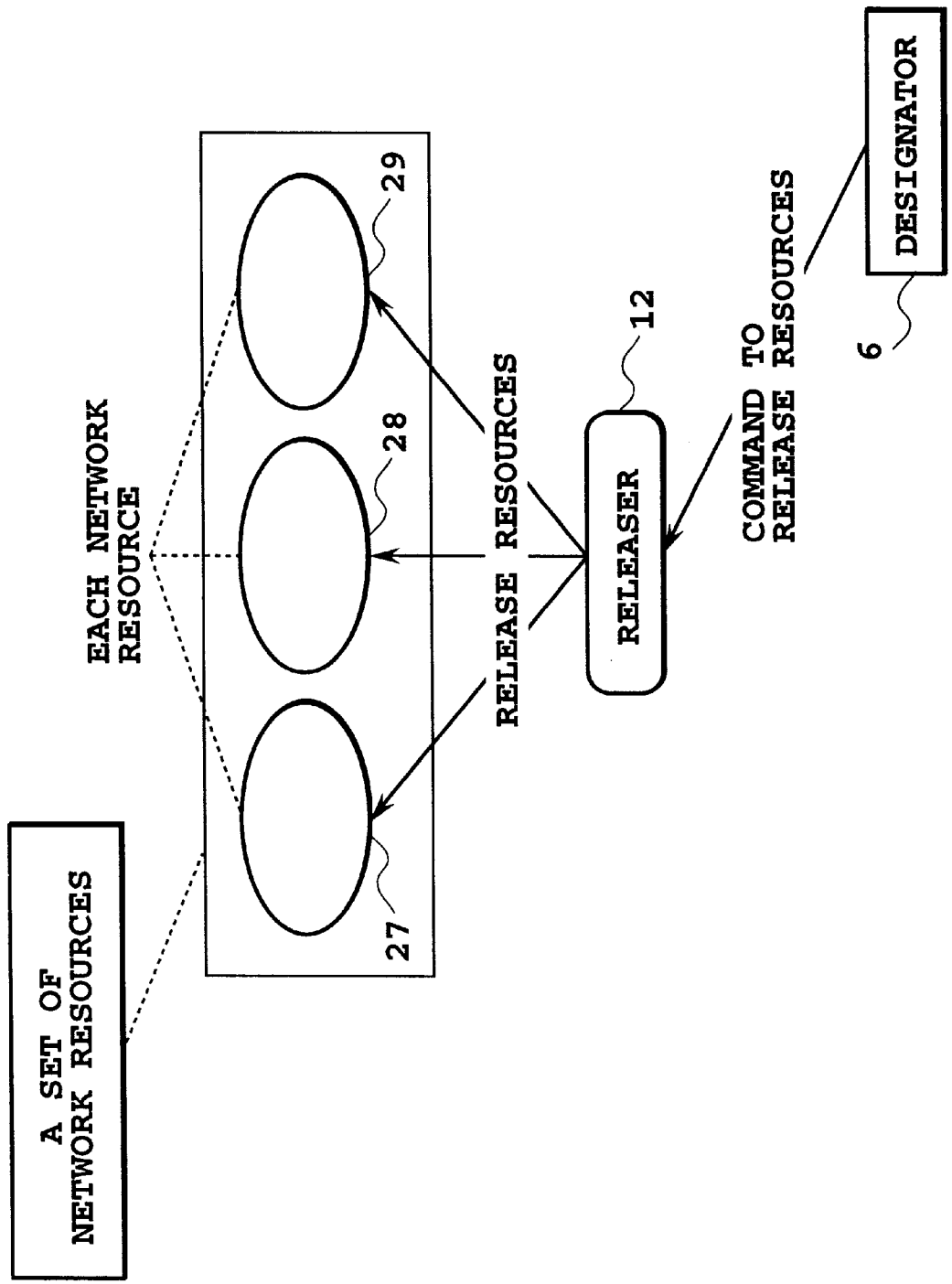
FIG. 18 is a diagram illustrating a release of the resources.

A configuration of a packet communications network for implementing the release of the entire set of resources needed for setting up a packet circuit is shown in FIG. 18.

FIG. 18 shows a set of network resources to be released in a batch. The releaser 12, which receives the command of releasing from the designator 6, relinquishes individual resources 27-29.

[RELEASE INDIVIDUAL RESOURCES AT SEPARATE TIMING]

Figure 19:
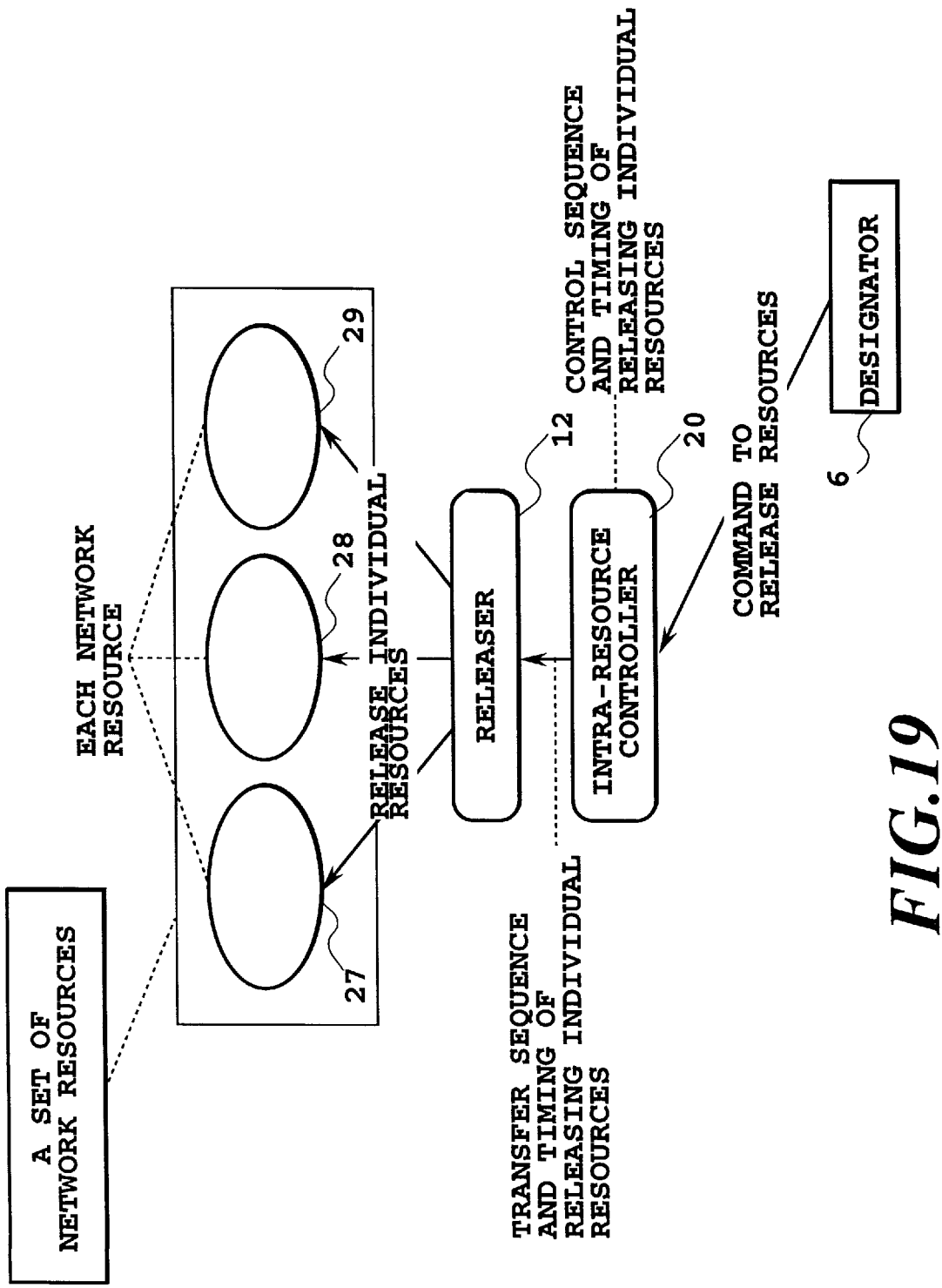
FIG. 19 is a diagram illustrating another release of the resources.

A configuration of a packet communications network for implementing, on the basis of the separate timing, the release of the individual resources needed for establishing a packet circuit is shown in FIG. 19.

FIG. 19 shows a set of resources to be released at separate timing, or the packet communications network which can control the sequence and timing of releasing the individual resources.

In FIG. 19, an intra-resource controller 20 is newly installed in addition to the network functions as shown in FIG. 18. The intra-resource controller 20 is connected to the designator 6 and the releaser 12. The designator 6 commands the intra-resource controller 20 to release the resources. The intra-resource controller 20 controls the sequence and timing of releasing the individual resources, and provides the releaser 12 with the sequence and timing of the releasing. The releaser 12 relinquishes the individual resources 27-29 in accordance with the command. Having these functions, the network can release the individual resources at different timing.

Thus, using the foregoing method can release the individual resources.

Combining the setting of the reference time period, the sequence of release, a release section and the like makes possible fine control of the network resources, improving the efficiency of making use of the network resources.

Figure 20B:
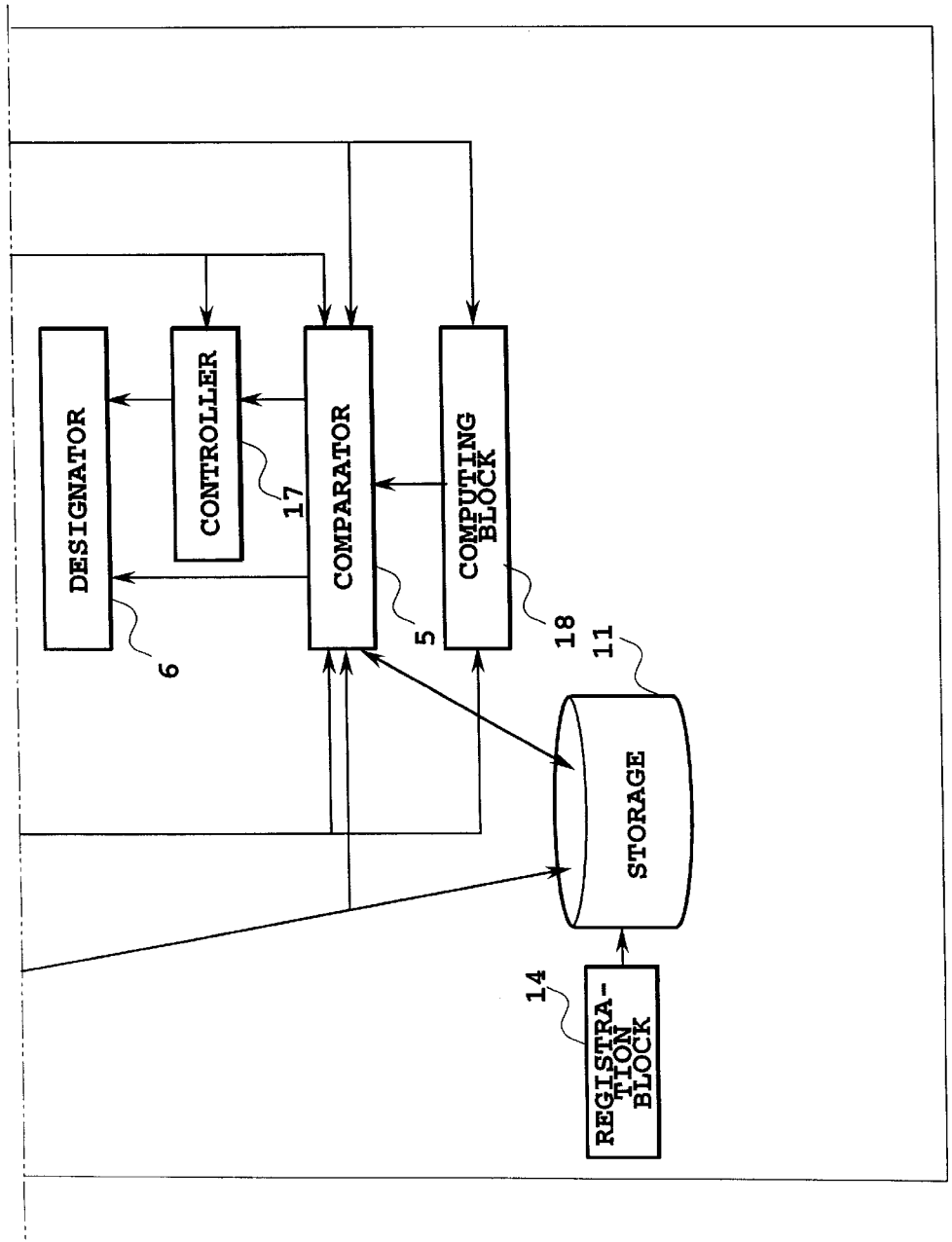

FIG. 20 illustrates overall control of the network resources when a fixed network user utilizes the network resources.

[NETWORK CONFIGURATION]

FIG. 20 shows a configuration of a fixed packet communications network.

In FIG. 20, the user terminal 1 is exchanging a packet with a party terminal 2 in an external fixed or mobile network.

Individual blocks of FIG. 20 will be described. The user terminal 1 designates one of the predetermined reference time periods, and rewrites the reference time period stored in the comparator 5 or storage 11.

The measuring blocks 13 and 13' each measure the packet exchanged time period and unexchanged time period of the user terminal 1, and the number of bytes of the packets, and provides the comparator 5 or the computing block 13 with the measured time periods.

The comparator 5 includes the prestored reference time period, compares it with the packet unexchanged time period, and notifies the designator 6 that the packet unexchanged time period exceeds the reference time period. The designator 6 commands the releaser 12, in accordance with the information transferred, to relinquish the resources. The releaser 12 relinquishes in response to the command the network resources 8 the user employs. The registration block 14 registers to, changes in and deletes from the storage 11 the reference time period. The storage 11 identifies the reference time period, and provides it to the comparator 5. The monitoring block 15 measures the working rates of the resources, and sends the measured data to the setting block 16.

The setting block 16 sets up the reference time period and the timing of releasing the network resources by using the data transferred, and provides the measured data to the comparator 5 and the controller 17. The controller 17 calculates the reference time period using the data transferred, and provides the measured data to the comparator 5. The controller 17 further controls the sequence and timing of releasing the network resources in accordance with the data, and supplies the designator 6 with the sequence and timing of the releasing. The intra-resource controller 20 controls the sequence and timing of releasing the individual network resources, and supplies the releaser 12 with the sequence and timing of the releasing.

[COMMUNICATION ESTABLISHMENT]

Since the procedure of establishing the communication in the network is the same as that of the normal communication establishment, the description thereof will be omitted here. The user sets up a communication, and the communication established mode begins. Thus, a communication path is established from the user terminal 1 to the party terminal 2 (1-3-8-4-2) in FIG. 20, thereby entering a state in which a packet can be transferred at any time (although a state continues in which no packet is actually transferred).

[TRANSITION TO COMMUNICATION HOLD MODE]

The measuring blocks 13 and 13' in the network each measure the traffic of the packet communication of the user, and supplies the data to the comparator 5 and the computing block 18.

The comparator 5 compares the packet unexchanged time period sent from the measuring block 13 with the reference time period which is predetermined at a fixed value "10 minutes" and stored in the comparator 5. When a fixed value varies from user to user, the comparator 5 reads from the storage 11 the reference time period of the user. When the user sets the reference time period by himself or herself, it is set immediately to the comparator 5 through the user terminal 1 connected thereto.

When the variable reference time period is set for each user in the network, the reference time period determined by the computing block 18 is used. When the single variable reference time period common to all the users is set in the network, the reference time period is used which is determined by the setting block 16 using the data supplied from the resource monitoring block 15.

The comparator 5 notifies the designator 6 that the packet unexchanged time period of the user exceeds the reference time period.

The designator 6 commands the releaser 12 to relinquish the network resources. It is assumed here that individual network resources 28-1 and 28-2 are released in a batch. However, if the individual network resources are to be released at different sequences and timing, the release command is sent to the intra-resource controller 20. The intraresource controller 20 sends a signal to the releaser 12 in accordance with the release sequence and timing which can be set at fixed valued in advance or set by the network in accordance with the working rates of the network resources.

Assume here that the control is applicable which can release the network resources step by step. The resource monitoring block 15, which monitors the conditions of the network resources in advance, sets, when it detects the release command issued to the network resources secured by the user, the condition of the resources into the common reserved mode (in which the resources are assigned precedently when the communication is restarted). When the user requests packet transmission or reception in this mode, a communication can be reestablished using idle resources in the network or common reserve resources secured by the user. When the user continues the unexchanged condition of the packet, and the time period of the reserve mode exceeds the reference time period, the resource monitoring block 15 released the resources completely. Iteration of the foregoing operation enables the effective use of the network resources.

Although the fixed packet communications network is described in FIG. 20, the resource control of the network can be applied to the packet communications in the foregoing mobile communications.

As described above, since the present invention can make effective use of the resources in the packet communications network, the working rates of the network resources are improved.

More specifically, as for a user who maintains the communication established mode for a long time without transferring a packet, the network resources are once released until the user restarts the communication. Thus, the released resources become available to other users, which makes it possible to offer the services to more users.

In addition, when the user in the communication reserved mode restarts the communication, the communication is reestablished in the network without the intervention of the user. This prevents degradation of the services to the users.

As described above, the present invention can provide economical communication services by allotting the network resources to as many users as possible with ensuring the users who carry out the packet data communication to offer required communication rates when they actually perform the data communication.

Furthermore, the present invention is applicable to the mobile radio packet communications which require control involved in the location control.

The handover is performed for a call in a communication state, thus carrying out a processing tracing the roaming. The tracing processing can be canceled during a period when no actual communications is carried out, and hence the tracing is unnecessary.

What is claimed is:

1. A packet communications network comprising:
monitoring means for monitoring traffic of a user after establishing a communication;

hold mode setting means for placing a communication mode of the user into a communication hold mode when the traffic monitored by said monitoring means satisfies a prescribed monitor condition; and mode recovering means for releasing the communication hold mode and recovering the communication mode when a packet communication is started in the communication hold mode.

2. The packet communications network as claimed in claim 1, wherein said communication hold mode is a mode that releases transmission path resources and transit node resources in a section of a user connection to allow another user to use the resources in the section, and behaves as if the communication mode was maintained toward a side placed in the communication mode.

3. The packet communications network as claimed in claim 1, wherein the prescribed monitor condition for proceeding from the communication mode to the communication hold mode is that no transmission nor reception of a user packet takes place during a reference time period.

4. The packet communications network as claimed in claim 1, wherein a node at an end of a section in the communication hold mode comprises connection acknowledging means for returning a false signal acknowledging a connection in response to a connection acknowledge signal which is sent in the communication hold mode from a side placed in the communication mode.

5. The packet communications network as claimed in claim 1, wherein a node at an end of a section in the communication hold mode comprises means for sending in the communication hold mode a connection acknowledge signal acknowledging a connection to a side placed in the communication mode.

6. The packet communications network as claimed in claim 5, wherein the node at the end comprises means for completing the communication when the node at the end cannot acknowledge the connection by sending the connection acknowledge signal.

7. The packet communications network of claim 1, wherein said mode recovering means releases the communication hold mode and recovers the communication mode when a restart of transmitting a packet from the user in the communication hold mode is detected, or a restart of receiving a packet addressed to the user in the communication hold mode is detected.

8. The packet communications network as claimed in claim 1, wherein the end mode of the section in the communication hold mode comprises a routing table which is stored at a transition to the hold mode and is used for the recovering.

9. The packet communications network as claimed in claim 1, wherein said packet communications network is a mobile network.

10. The packet communications network as claimed in claim 9, further comprising means for notifying of roaming of a user; means for transferring about the user to means for managing information installed in a destination of the roaming; means for securing network resources in accordance with the information about the user; means for deleting the information about the user which becomes unnecessary to be managed; and means for releasing resources in an origination of the roaming.

11. A packet communications network comprising:
monitoring means for monitoring traffic of a user after establishing a communication, said monitoring means comprising means for measuring a time period during which each user suspends packet transmission and reception, and for sending the measured time period;

hold mode setting means for placing a communication mode of the user into a communication hold mode when no transmission nor reception of a user packet takes place during a reference time period, said hold mode setting means comprising means for receiving the measured time period sent, for comparing the measured time period with the reference time period, and for notifying that the measured time period exceeds the reference time period, means for issuing a release command of the resources assigned to the user when notified that the reference time period is exceeded, and means for releasing the resources assigned to the user in response to the release command issued; and a mode recovering means for releasing the communication hold mode and recovering the communication mode when a packet communication is started in the communication hold mode.

12. The packet communications network as claimed in claim 11, wherein said means for releasing the resources changes a state of the resources according to time.

13. The packet communications network as claimed in claim 12 comprising a mode which precedently assigns resources to the user in the hold mode when changing the state of the resources according to time.

14. The packet communications network as claimed in claim 11, wherein said hold mode setting means further comprises means for changing the reference time period.

15. The packet communications network as claimed in claim 14, wherein said means for changing the reference time period comprises:
storage means for registering and recording a reference time period for each user; and
means for referring the reference time period stored in said storage means for each user.

16. The packet communications network as claimed in claim 14, wherein said means for changing the reference time period comprises:
means for enabling each user to designate the reference time period.

17. The packet communications network as claimed in claim 14, wherein said means for changing the reference time period comprises:
means for measuring for each user a frequency of use of communications; and
means for computing the reference time period based on the frequency, and for setting it.

18. The packet communications network as claimed in claim 14, wherein said means for changing the reference time period comprises:
means for continuously monitoring a working rate of network resources; and
means for setting the reference time period in accordance with the working rate.

19. The packet communications network as claimed in claim 11, wherein said means for releasing resources further comprises release control means for controlling a sequence and timing of a release of the resources secured by each user.

20. The packet communications network as claimed in claim 19, wherein said release control means controls the release based on a predetermined sequence and timing.

21. A resource managing method in a packet communications network comprising the steps of:
monitoring traffic of a user after establishing a communication;
releasing at least part of resources assigned to the user by placing a communication mode of the user into a communication hold mode when the traffic monitored in said monitoring step satisfies a prescribed monitor condition; and releasing the communication hold mode and recovering the communication mode when a packet communication is started in the communication hold mode.

22. The method as claimed in claim 21, wherein said communication hold mode is a mode that releases transmission path resources and transit node resources in a section of a user connection to allow another user to use the resources in the section, and behaves as if the communication mode was maintained toward a side placed in the communication mode.

23. The method as claimed in claim 21, wherein the prescribed monitor condition for proceeding from the communication mode to the communication hold mode is that no transmission nor reception of a user takes place during a reference time period.

24. The method as claimed in claim 21, wherein a node at an end of a section in the communication hold mode returns a false signal acknowledging a connection in response to a connection acknowledge signal which is sent in the communication hold mode from a side placed in the communication mode.

25. The method as claimed in claim 21, wherein a node at an end of a section in the communication hold mode sends in the communication hold mode a connection acknowledge signal acknowledging a connection to a side placed in the communication mode.

26. The method as claimed in claim 25, wherein the node at the end completes the communication when the node at the end cannot acknowledge the connection by sending the connection acknowledge signal.

27. The method of claim 21, wherein said recovering step releases the communication hold mode and recovers the communication mode when a restart of transmitting a packet from the user in the communication hold mode is detected, or a restart of receiving a packet addressed to the user in the communication hold mode is detected.

28. The method as claimed in claim 21, further comprising the step of storing, when making a transition to the hold mode, a routing table in the end node of the section in the communication hold mode, the routing table being used for the recovering.

29. The method as claimed in claim 21, wherein said packet communications network is a mobile network.

30. The method as claimed in claim 29, further comprising the steps of notifying of roaming of a user; managing information about the user by using information installed in a destination of the roaming; securing network resources in accordance with the information about the user; deleting the information about the user which becomes unnecessary to be managed; and releasing resources in an origination of the roaming.

31. A resource managing method in a packet communications network comprising the steps of:

monitoring traffic of a user after establishing a communication, the step of monitoring comprising the step of measuring a time period during which each user suspends packet transmission and reception;

releasing at least part of resources assigned to the user by placing a communication mode of the user into a communication hold mode when no transmission nor reception of a user takes place during a reference time period, the step of setting the hold mode comprising the steps of receiving the measured time period sent, comparing the measured time period with a predetermined reference time period, and notifying that the measured time period exceeds the reference time period, issuing a release command of the resources assigned to the user when notified that the reference time period is exceeded, and releasing the resources assigned to the user in response to the release command issued; and releasing the communication hold mode and recovering the communication mode when a packet communication is started in the communication hold mode.

32. The method as claimed in claim 31 wherein the step of releasing the resources changes a state of the resources according to time.

33. The method as claimed in claim 32 comprising a mode which precedently assigns resources to the user in the hold mode when changing the state of the resources according to time.

34. The method as claimed in claim 31, wherein the step of setting the hold mode further comprises a step of changing the reference time period.

35. The method as claimed in claim 34, wherein the step of changing the reference time period comprises the step of:

registering and recording a reference time period for each user; and referring the reference time period stored in said storage means for each user.

36. The method as claimed in claim 34, wherein the step of changing the reference time period comprises the step of:

enabling each user to designate the reference time period.

37. The method as claimed in claim 34, wherein the step of changing the reference time period comprises the steps of:

measuring for each user a frequency of use of communications; and computing the reference time period based on the frequency, and setting it.

38. The method as claimed in claim 34, wherein the step of changing the reference time period comprises the steps of:

continuously monitoring a working rate of network resources; and setting the reference time period in accordance with the working rate.

39. The method as claimed in claim 31, wherein the step of releasing resources further comprises a release control step of controlling a sequence and timing of a release of the resources secured by each user.

40. The method as claimed in claim 39, wherein the release control step controls the release based on a predetermined sequence and timing.

* * * * *

UNITED STATES PATENT AND TRADEMARK OFFICE
CERTIFICATE OF CORRECTION

PATENT NO. : 6,310,859 B1
DATED : October 30, 2001
INVENTOR(S) : Morita et al.

It is certified that error appears in the above-identified patent and that said Letters Patent is hereby corrected as shown below:

Title page,
Under Foreign Application Priority Data, "9-2991205" should be -- 9-299205 --.

Signed and Sealed this

Twenty-eighth Day of May, 2002

Attest:

JAMES E. ROGAN
*Attesting Officer*   *Director of the United States Patent and Trademark Office*